(12) United States Patent
Huang et al.

(10) Patent No.: US 11,835,760 B1
(45) Date of Patent: Dec. 5, 2023

(54) CALIBRATION SYSTEM FOR WAVELENGTH-DIVISION MULTIPLEXING, WAVELENGTH-DIVISION MULTIPLEXING SYSTEM, AND CALIBRATING METHOD FOR WAVELENGTH-DIVISION MULTIPLEXING

(71) Applicant: TAIWAN SEMICONDUCTOR MANUFACTURING COMPANY LTD., Hsinchu (TW)

(72) Inventors: Tai-Chun Huang, New Taipei (TW); Lan-Chou Cho, Hsinchu (TW); Chewn-Pu Jou, Hsinchu (TW); Stefan Rusu, Sunnyvale, CA (US)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 17/843,940

(22) Filed: Jun. 17, 2022

(51) Int. Cl.
*G02B 6/12* (2006.01)

(52) U.S. Cl.
CPC ..... *G02B 6/12026* (2013.01); *G02B 6/12016* (2013.01)

(58) Field of Classification Search
CPC ............ G02B 6/12026; G02B 6/12033; G02B 6/2938; G02B 6/29385; G02B 6/29395; G02B 6/29398; H04B 10/572
See application file for complete search history.

(56) References Cited

U.S. PATENT DOCUMENTS

| | | | | |
|---|---|---|---|---|
| 5,617,234 A | * | 4/1997 | Koga | H04B 10/506 398/95 |
| 5,754,718 A | * | 5/1998 | Duck | G02B 6/2937 385/33 |
| 5,917,626 A | * | 6/1999 | Lee | G02B 6/29395 385/24 |
| 6,088,142 A | * | 7/2000 | Cao | H04B 10/506 398/1 |
| 6,192,170 B1 | * | 2/2001 | Komatsu | H04B 10/506 385/24 |
| 6,282,340 B1 | * | 8/2001 | Nasu | H04B 10/572 372/20 |

(Continued)

FOREIGN PATENT DOCUMENTS

CN 110596914 A * 12/2019

*Primary Examiner* — Michael Stahl
(74) *Attorney, Agent, or Firm* — WPAT LAW; Anthony King

(57) ABSTRACT

The present disclosure provides a calibration system for wavelength-division multiplexing (WDM), a WDM system, and a calibrating method for WDM. The calibration system includes heating devices, an optical sensor, and an electrical device. When the optical sensor receives no beam with energy exceeding a threshold value from a first channel, the optical sensor transmits a first signal to the electrical device. In response to the first signal, the electrical device is configured to control the one or more of the heating devices to heat one or more of channels. When the optical sensor receives a beam having energy exceeding the threshold value from the first channel, the optical sensor transmits a second signal to the electrical device. In response to the second signal, the electrical device is configured to control the one or more of the heating devices to maintain the temperature of the one or more of the channels.

20 Claims, 14 Drawing Sheets

(56) References Cited

U.S. PATENT DOCUMENTS

| | | | | |
|---|---|---|---|---|
| 6,853,773 | B2* | 2/2005 | Lin | G02B 6/12033 |
| | | | | 385/39 |
| 7,139,455 | B1* | 11/2006 | Gunn, III | G02B 6/12019 |
| | | | | 385/129 |
| 11,105,980 | B1* | 8/2021 | Hu | H04J 14/0209 |
| 2004/0113055 | A1* | 6/2004 | Whelan | G01B 11/18 |
| | | | | 250/227.18 |
| 2013/0243432 | A1* | 9/2013 | McGreer | G02B 6/3548 |
| | | | | 398/49 |
| 2015/0309258 | A1* | 10/2015 | Fincato | G02B 6/12014 |
| | | | | 398/87 |
| 2016/0134079 | A1* | 5/2016 | Liao | H01S 3/0078 |
| | | | | 398/38 |
| 2019/0097732 | A1* | 3/2019 | Akiyama | H04B 10/07955 |
| 2019/0379453 | A1* | 12/2019 | Toda | H04B 10/07955 |

* cited by examiner

CALIBRATION SYSTEM FOR WAVELENGTH-DIVISION MULTIPLEXING, WAVELENGTH-DIVISION MULTIPLEXING SYSTEM, AND CALIBRATING METHOD FOR WAVELENGTH-DIVISION MULTIPLEXING

BACKGROUND

Silicon photonics applications in wavelength-division multiplexing (WDM) include multiple channels for transmitting beams. The channels may need to be calibrated so that the characteristics of the beams that the channels transmit meet the requirement of the next stage in the silicon photonics applications. However, regarding multi-channel outputs, much time is needed for calibration to ensure that the transmitted beams have the correct characteristics.

BRIEF DESCRIPTION OF THE DRAWINGS

Aspects of the present disclosure are best understood from the following detailed description when read with the accompanying figures. It is emphasized that, in accordance with standard practice in the industry, various features are not drawn to scale. In fact, the dimensions of the various features may be arbitrarily increased or reduced for clarity of discussion.

DETAILED DESCRIPTION

Figure 1:
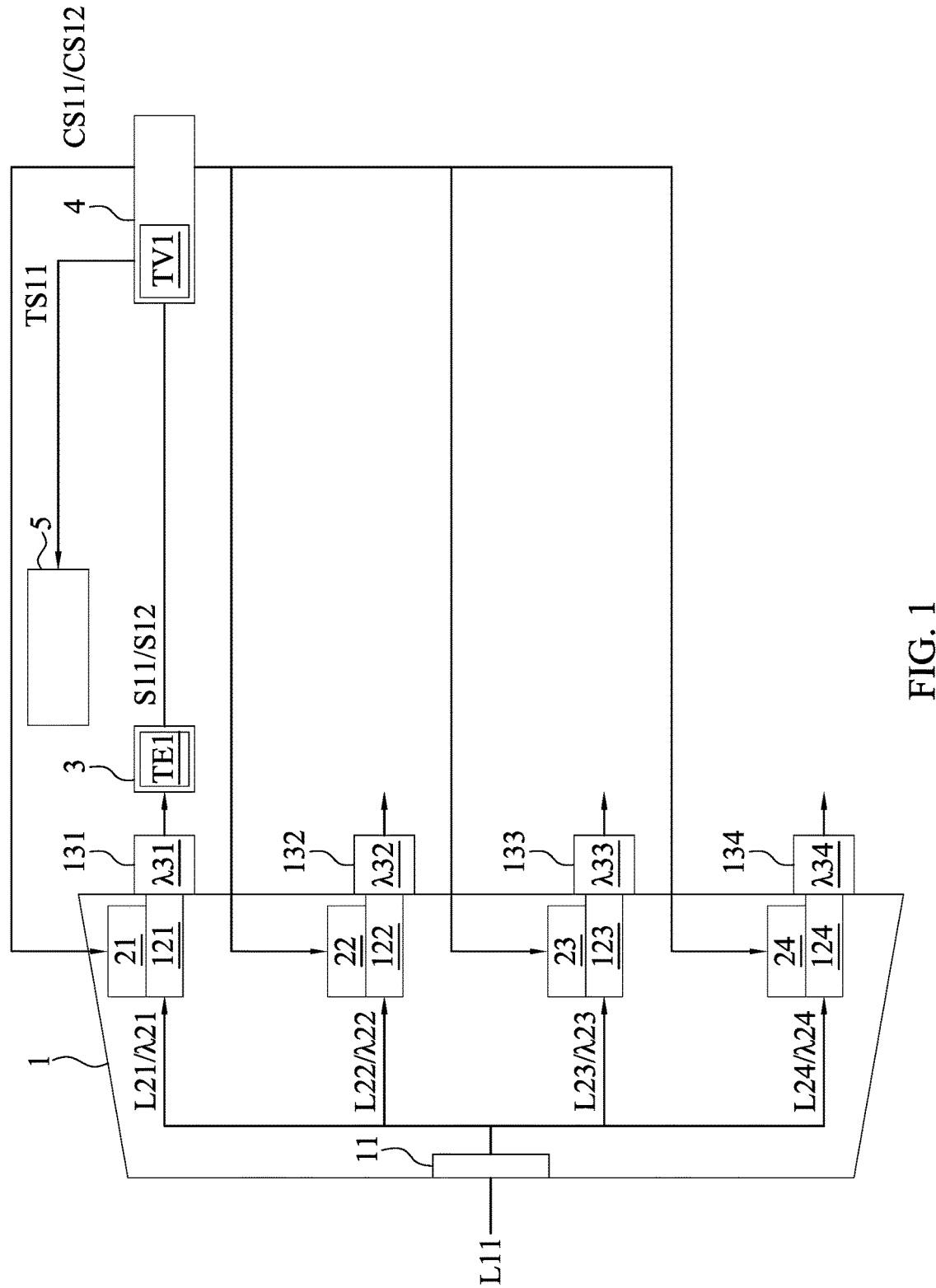
FIG. 1 is a block diagram of a wavelength-division multiplexing (WDM) system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Embodiments, or examples, illustrated in the drawings are disclosed as follows using specific language. It will nevertheless be understood that the embodiments and examples are not intended to be limiting. Any alterations or modifications in the disclosed embodiments, and any further applications of the principles disclosed in this document are contemplated as would normally occur to one of ordinary skill in the pertinent art.

Further, it is understood that several processing steps and/or features of a device may be only briefly described. Also, additional processing steps and/or features can be added, and certain of the following processing steps and/or features can be removed or changed while still implementing the claims. Thus, it is understood that the following descriptions represent examples only, and are not intended to suggest that one or more steps or features are required.

In addition, the present disclosure may repeat reference numerals and/or letters in the various examples. This repetition is for the purpose of simplicity and clarity and does not in itself dictate a relationship between the various embodiments and/or configurations discussed.

FIG. 1 is a block diagram of a wavelength-division multiplexing (WDM) system 100, in accordance with some embodiments. As shown in FIG. 1, the WDM system 100 includes a demultiplexer 1, a plurality of heating devices 21, 22, 23, and 24, an optical sensor 3, an electrical device 4, and a thermal sensor 5. The demultiplexer 1 is communicated with the optical sensor 3. In some embodiments, the demultiplexer 1 is communicated with the optical sensor 3 through an optical fiber, a wire, or air. The demultiplexer 1 may be communicated with the optical sensor 3 through an optical signal or an electrical signal, or in combination. The optical sensor 3 is connected to the electrical device 4 through a wire or wirelessly. The electrical device 4 is connected to the thermal sensor 5 through a wire or wirelessly. The electrical device 4 is connected to the plurality of heating devices 21, 22, 23, and 24 through a wire or wirelessly.

The demultiplexer 1 is configured to receive an input beam L11, which may be a wavelength broadband beam. The input beam L11 may come from a wavelength broadband source. The input beam L11 may come from a multiplexer, which may be part of the WDM system 100. In some embodiments, the input beam L11 may have a plurality of wavelengths in a range of ultraviolet, visible light, infrared (IR), near-infrared (NIR), or microwave. The wavelengths of the input beam L11 may carry digital signals which have the same rate or the same data format, or they may have different rates or different data formats.

The demultiplexer 1 includes a wavelength divider 11, a plurality of channels 121, 122, 123, and 124, and input/output (I/O) components 131, 132, 133, and 134. The wavelength divider 11 is configured to receive the input beam L11 and divide the input beam L11 into a plurality of beams L21, L22, L23, and L24. The wavelength divider 11 may include an optical arrangement configured to split the input beam L11 into multiple beams. The wavelength divider 11 may include a beam splitter configured to split the input beam L11. The beam (or a first beam) L21 has a wavelength (or a first wavelength) λ21. In some embodiments, the first wavelength λ21 of the first beam L21 is a central wavelength of the transmittance distribution of the beam L21. The central wavelength may be a peak wavelength when the distribution of the beam L21 is fitted by Gauss. The beam (or a second beam) L22 has a wavelength (or a second wavelength) λ22. In some embodiments, the second wavelength λ22 of the second beam L22 is a central wavelength of the distribution of the second beam L22. The beam (or a third beam) L23 has a wavelength (or a third wavelength) λ23. In some embodiments, the third wavelength λ23 of the third beam L23 is a central wavelength of the distribution of the third beam L23. The beam (or a fourth beam) L24 has a wavelength (or a fourth wavelength) λ24. In some embodiments, the fourth wavelength λ24 of the fourth beam L24 is a central wavelength of the distribution of the fourth beam L24.

The wavelength divider 11 is connected to the plurality of channels 121, 122, 123, and 124. As shown in FIG. 1, the wavelength divider 11 transmits the first beam L21 to the channel (or a first channel) 121. The first channel 121 is configured to transmit the first beam L21 between the wavelength divider 11 and the I/O component (a first I/O component) 131. The first channel 121 may include a waveguide. The first channel 121 may include an interferometer (such as a Mach-Zehnder interferometer), a ring resonator, or the like, The first I/O component 131 may include a grating coupler. In some embodiments, the first I/O component 131 may be integrated with the first channel 121. The first I/O component 131 is configured to change the propagation (e.g., a direction of the propagation) of the first beam L21 from the channel 121, such that an optical fiber connected between the first channel 121 and the optical sensor 3 can receive the first beam L21 in a way that causes less transmission loss.

The first I/O component 131 has a filtering wavelength (e.g., a first filtering wavelength) λ31. The first I/O component 131 is configured to filter out the first beam L21 when the first wavelength λ21 is different from the first filtering wavelength λ31. In other words, no beam is transmitted from the first I/O component 131 when the first wavelength λ21 is different from the first filtering wavelength λ31. For example, when the first wavelength λ21 is smaller or larger than the first filtering wavelength λ31 with an offset, the first beam L21 would be filtered out and no beam would come out from the first I/O component 131. The offset may be in the order of nanometers (nm) or picometers (pm). In some embodiments, the first filtering wavelength λ31 may be a central wavelength that defines a bandwidth within which a beam can transmit through the first I/O component.

Figure 2:
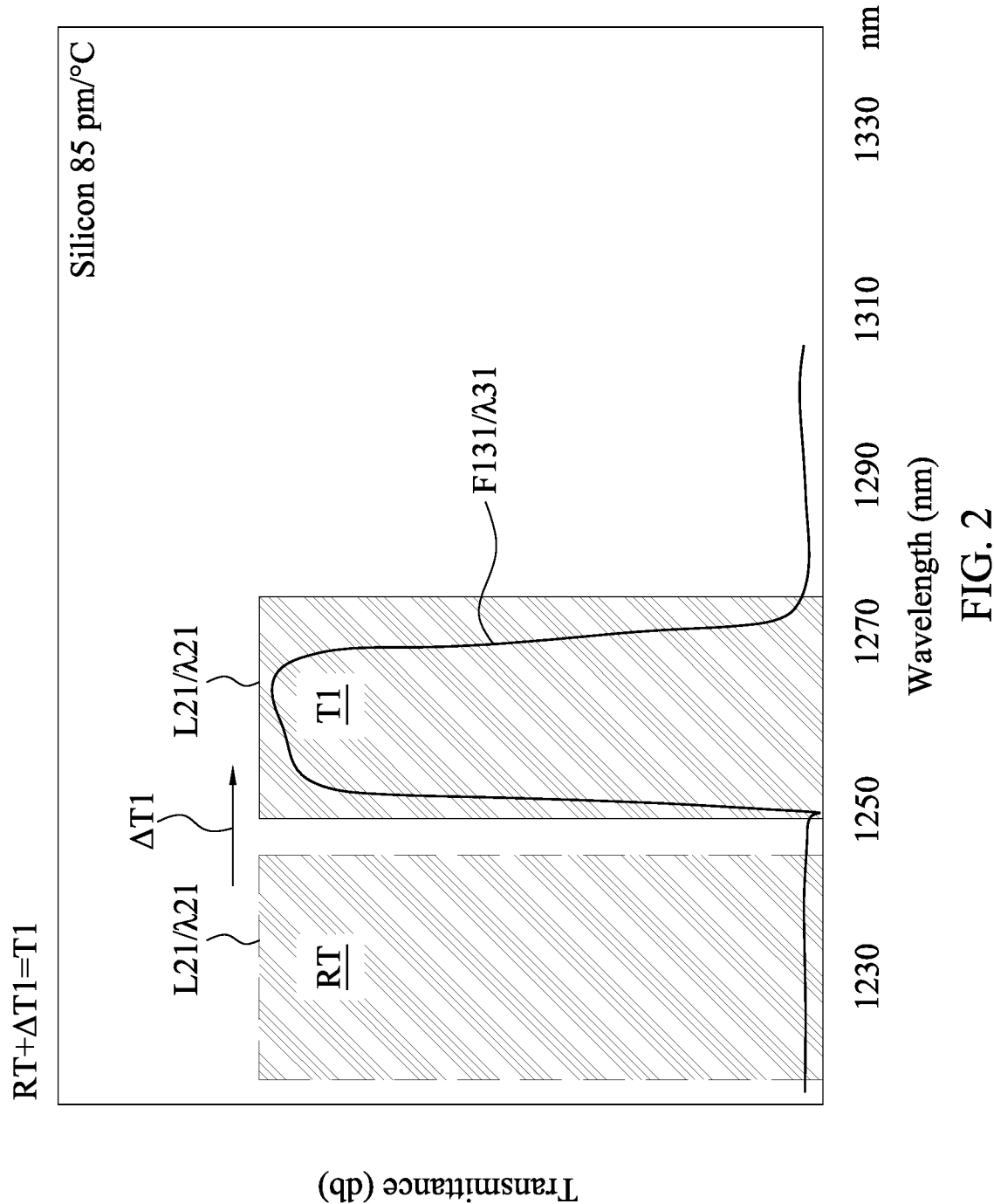
FIG. 2 is a graph illustrating transmittance versus wavelength of the optical signal of a channel of a demultiplexer, in accordance with some embodiments.

FIG. 2 is a graph illustrating transmittance versus wavelength of the first beam L21 of the first channel 121 of the demultiplexer 1, in accordance with some embodiments. As shown in FIG. 2, the first I/O component 131 defines a frequency response F131 with the first filtering wavelength λ31. The frequency response F131 acts as a filter that filters out the beams that do not fall in the bandwidth defined by the filtering wavelength λ31. The dashed box represents the first wavelength λ21 of the first beam L21 when the first channel 121 is at room temperature RT (e.g., 25° C.). The dashed box does not overlap the frequency response F131. In other words, the first wavelength λ21 of the first beam L21 is different from the first filtering wavelength λ31. As such, the first beam L21 will be filtered out by the first I/O component 131 and no beam would be transmitted by the first I/O component 131.

As such, the present disclosure discloses a calibration system to calibrate, adjust, or modulate the first wavelength λ21 of the first beam L21. The calibration system includes, for example, the optical sensor 3, the electrical device 4, the thermal sensor 5, and the heating device 21.

The optical sensor 3 is configured to receive the beams from the demultiplexer 1, e.g., the first channel 121 and/or the first I/O component 131. The optical sensor 3 is configured to determine whether the received beams have energy exceeding a threshold energy value (or a first threshold value) TE1. When the first wavelength λ21 of the first beam L21 is different from the filtering wavelength λ31, no beam would be transmitted from the first channel. When the optical sensor 3 receives no beam with energy that exceeds the threshold energy value TE1, the optical sensor 3 generates a first signal S11 to the electrical device 4. The first signal S11 may be an electrical signal. The first signal S11 may have a first value. In some embodiments, the first value of the first signal S11 may be logic low, e.g., "0."

In some embodiments, the optical sensor 3 can be any other form of sensors, such as an infrared sensor, photovoltaic cell, or the like.

In some embodiments, the optical sensor 3 may include a PIN photodiode. The PIN photodiode of the optical sensor 3 is a diode with a wide, undoped intrinsic semiconductor region between a p-type semiconductor and an n-type semiconductor region. The p-type and re-type regions are typically heavily doped because they are used for ohmic contacts. In some embodiments, the PIN photodiode of the optical sensor 3 is reverse-biased. A depletion region extends across the intrinsic semiconductor region. When photons of sufficient energy (e.g., a beam with energy exceeding the threshold energy value TE1) enter the depletion region of the diode, electron-hole pairs will be generated. The reverse-bias field will then sweep the carriers out of the depletion region, creating current. When no beam with energy exceeding the threshold energy value TE1 enters in the depletion region of the PIN photodiode of the optical sensor 4, no electron-hole pairs are generated. Subsequently, the PIN photodiode of the optical sensor 3 would not generate an electrical current (omit the reverse current) and the optical sensor 3 would generate the first signal S11 (e.g., with a logic low value).

The electrical device 4 is configured to receive the first signal S11. The electrical device 4 is configured to determine whether the first value of the first signal S11 is lower than a threshold value (or a second threshold valve) TV1. The threshold value TV1 may be a logic high, e.g., "1." When the first value of the first signal S11 is lower than the threshold value TV1, the electrical device 4 transmits a control signal (a first control signal) CS11 to the first heating device (or the first heating device) 21. The control signal CS11 may be an electrical signal. In response to the first signal S11, the electrical device 4 is configured to control the first heating device 21 to heat the first channel 121.

The first channel 121 is applied with the first heating device 21. The first heating device 21 is thermally coupled with the first channel 121. The first heating device 21 is configured to change the temperature of the first channel 121. The heating device 21 can be a metal heater. For example, the first heating device 21 can generate heat induced by an electrical current. The form and type of the heating device 21 are not limited. In some embodiments, the first heating device 21 can be configured to calibrate, adjust, or modulate the resonant wavelength of the first channel 121 thermally. The first heating device 21 can provide heat to the first channel 121, so that the temperature thereof can be increased. The temperature of the first channel 121 is correlated to the refractive index thereof, which changes the first wavelength $\lambda 21$ of the first beam L21. In some embodiments, if a channel (e.g., the first channel 121) is made of silicon, the ratio of the variation of the wavelength of the transmitted beam (e.g., the first wavelength $\lambda 21$ of the first beam L21) and the variation of the temperature of a channel is about 85 pm/° C. As such, when the heating device 21 heats the first channel 121, the first wavelength $\lambda 21$ of the first beam L21 increases correspondingly. The heating device 21 can be used for calibrating, adjusting, or modulating the first wavelength $\lambda 21$ of the first beam L21 to meet the first filtering wavelength $\lambda 31$.

In response to the first control signal CS11, the heating device 21 is configured to change the temperature of the first channel 121 with a first delta temperature value $\Delta T1$. The refractive index of the first channel 12 is shifted based on the first delta temperature value $\Delta T1$. The first delta temperature value $\Delta T1$ may be any figure. For the purpose of this explanation, the first delta temperature value $\Delta T1$ is assumed to be a positive figure. Referring again to FIG. 2, the solid box represents the first wavelength $\lambda 21$ of the first beam L21 when the first channel 121 is at a first temperature T1, which equals the room temperature RT plus the first delta temperature value $\Delta T1$. The arrow in FIG. 2 denoted by $\Delta T1$ represents the wavelength change caused by the first delta temperature value $\Delta T1$. The first wavelength 21 of the first beam L21 is adjusted, such that the distribution of the first beam L21 is covered by the bandwidth of the frequency response F131. In other words, the first wavelength $\lambda 21$ of the first beam L21 meets the first filtering wavelength $\lambda 31$ of the I/O component 131. In some embodiments, the first wavelength $\lambda 21$ may be substantially equal to the first filtering wavelength $\lambda 31$. For example, the difference between the first wavelength $\lambda 21$ and the first filtering wavelength $\lambda 31$ is smaller than the offset as discussed above.

The I/O component 131 is configured to transmit the first beam L21 when the first wavelength $\lambda 21$ meets the first filtering wavelength $\lambda 31$. Subsequently, the first beam L21 is transmitted to the optical sensor 3 through the optical fiber. The optical sensor 3 is configured to receive the beams from the demultiplexer 1, e.g., the first channel 121 and/or the first I/O component 131. The optical sensor 3 is configured to determine whether the received beams have energy exceeding the threshold energy value TE1. The optical sensor 3 may conduct a photoelectric conversion in response to the first beam L21. When the optical sensor 3 receives the first beam L21 having energy that exceeds the threshold energy value TE1, the optical sensor 3 generates a second signal S12. The second signal S12 is an electrical signal. The second signal S12 may have a second value. The second value of the second signal S12 is different from the first value of the first signal S11. The second value of the second signal S12 may have a logic high value, e.g., "1." In some embodiments, the PIN photodiode of the optical sensor 3 receives the first beam L21 and generates enough electron-hole pairs to create a relatively large electrical current (e.g., as compared to the reverse current). As such, the optical sensor 3 can generate the second signal S12 (e.g., with a logic high value).

The electrical device 4 is configured to receive the second signal S12. The electrical device 4 is configured to compare the second value of the second signal S12 with the threshold value TV1. When the second value of the second signal S12 is the same as the threshold value TV1, the electrical device 4 transmits a control signal (a second control signal) CS12 to the first heating device 21. The second control signal CS12 may be an electrical signal. In response to the second control signal CS12, the first heating device 21 is configured to stop heating or maintain the temperature of the first channel 121 through various means, such as by being detached from the first channel 121 or by maintaining the heating, or turning off the heating, In response to the second signal S12, the electrical device 4 is configured to control the first heating device 21 (e.g., through the second control signal CS12) to stop heating or maintain the temperature of the first channel 121. Referring again to FIG. 2, the distribution of the first beam L21 mainly overlaps the frequency response of the first I/O component 131. The first beam L21 with the modulated/adjusted/calibrated wavelength $\lambda 21$ carries the correct data and can be transmitted to the next stage through an optical fiber (not shown). The optical sensor 3, the electrical device 4, and the heating device 21 of the calibration system provide a fast and precise way to calibrate, adjust, or modulate the first wavelength $\lambda 21$ of the first beam L21 transmitted in the first channel 121. The time needed for the calibration, adjustment or modulation of the first channel 121 can be significantly reduced.

The electrical device 4 is configured to generate an electrical signal TS11 and transmit it to the thermal sensor (or a first thermal sensor) 5. In response to the first electrical signal TS11, the first thermal sensor 5 is configured to measure the temperature of the first channel 21. The first thermal sensor 5 may be connected to the first channel 121. The first thermal sensor 5 may have a component thermally connected to the first channel 121. A user may be aware of the temperature of the first channel 121 of the demultiplexer through the thermal sensor 5. The user may heat the other channels based on the read temperature from the thermal sensor 5.

As shown in FIG. 1, the wavelength divider 11 transmits the second beam L22 with the second wavelength $\lambda 22$ to the channel (or a second channel) 122. The second channel 122 may include a waveguide. The second channel 122 is configured to transmit the second beam L22 between the wavelength divider 11 and the I/O component (a second I/O component) 132. The second I/O component 132 has a filtering wavelength (e.g., a second filtering wavelength) $\lambda 32$. The second I/O component 132 is configured to filter out the second beam L22 when the second wavelength $\lambda 22$ is different from the second filtering wavelength $\lambda 32$. In other words, no beam is transmitted from the second 110 component 132 when the second wavelength $\lambda 22$ is different from the second filtering wavelength $\lambda 32$.

The wavelength divider 11 transmits the third beam L23 with the third wavelength $\lambda 23$ to the channel (or a third channel) 123. The third channel 123 may include a waveguide. The third channel 123 is configured to transmit the third beam L23 between the wavelength divider 11 and the I/O component (a third I/O component) 133. The third I/O component 133 has a filtering wavelength (e.g., a third filtering wavelength) $\lambda 33$. The third I/O component 133 is configured to filter out the third beam L23 when the third wavelength $\lambda 23$ is different from the third filtering wavelength $\lambda 33$. In other words, no beam is transmitted from the third I/O component 133 when the third wavelength $\lambda 23$ is different from the third filtering wavelength $\lambda 33$.

The wavelength divider 11 transmits the fourth beam L24 with the fourth wavelength λ24 to the channel (or a fourth channel) 124. The fourth channel 124 may include a waveguide. The fourth channel 124 is configured to transmit the fourth beam L24 between the wavelength divider 11 and the I/O component (a fourth I/O component) 134. The fourth I/O component 134 has a filtering wavelength (e.g., a fourth filtering wavelength) λ34. The fourth I/O component 134 is configured to filter out the fourth beam L24 when the fourth wavelength λ24 is different from the fourth filtering wavelength λ34. In other words, no beam is transmitted from the fourth I/O component 134 when the fourth wavelength λ24 is different from the fourth filtering wavelength λ34.

Figure 3:
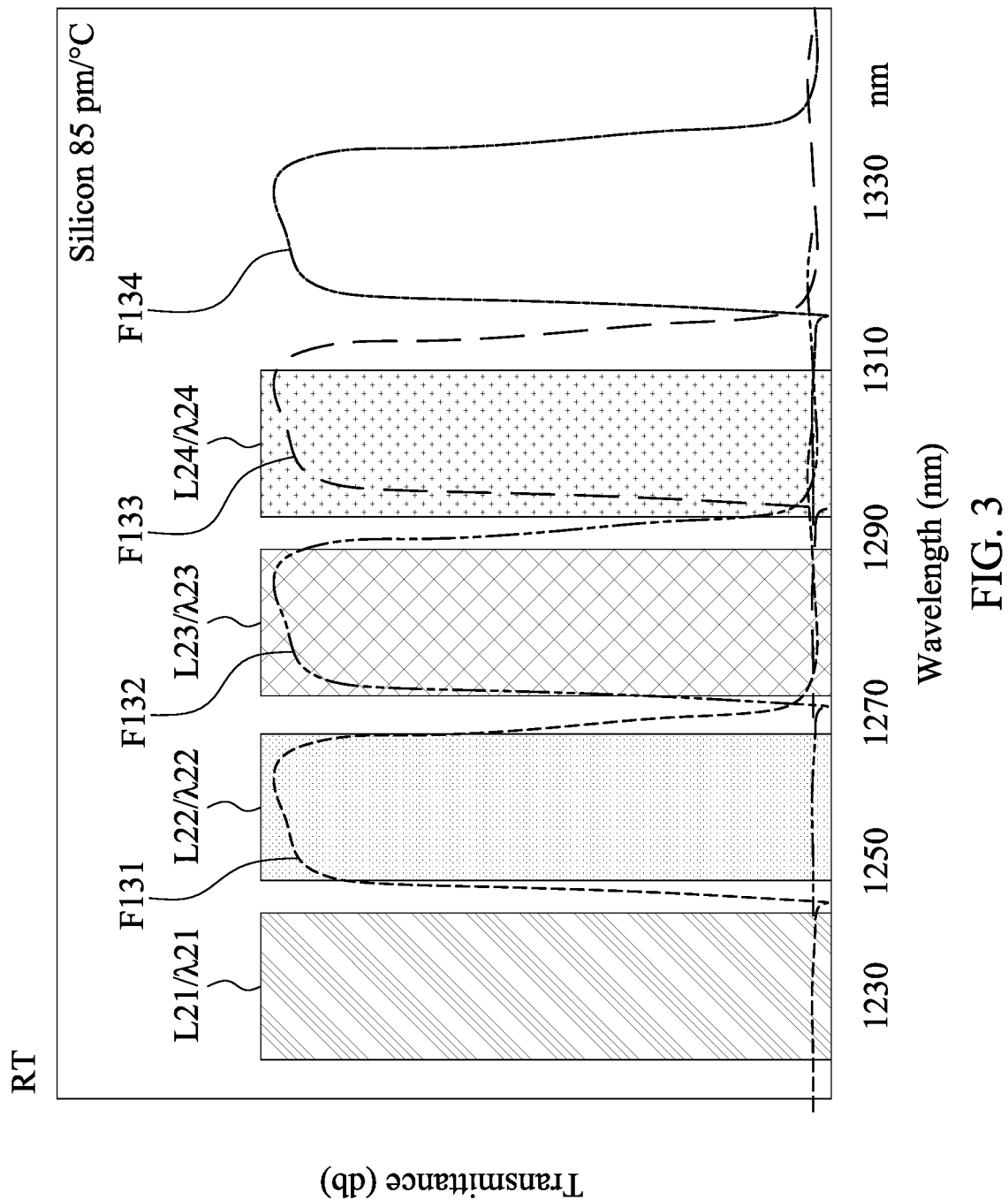
FIG. 3 is a graph illustrating transmittance versus wavelength of the optical signals of a plurality of channels of a demultiplexer, in accordance with some embodiments.

FIG. 3 is a graph illustrating transmittance versus wavelengths of multiple beams (e.g., the first, second, third, and fourth beams 21, 22, 23, and 24 of the multiple channels (e.g., the first, second, third, and fourth channels 121, 122, 123, and 124) of the demultiplexer 1, in accordance with some embodiments. As shown in FIG. 3, the second I/O component 132 defines a frequency response F132 with the second filtering wavelength λ32; the third I/O component 133 defines a frequency response F133 with the third filtering wavelength λ33; the fourth I/O component 134 defines a frequency response F134 with the fourth filtering wavelength λ34.

The leftmost box in FIG. 3 denoted with the symbol L21 represents the distribution of the first beam L21 at room temperature RT. For example, the first wavelength λ21 is about 1230 nm. The leftmost box does not overlap the frequency response F131. In other words, the first wavelength λ21 of the first beam L21 is different from the first filtering wavelength λ31. As such, the first beam L21 will be filtered out by the first I/O component 131 and no beam would be transmitted by the I/O component 131.

The second-from-left box denoted with the symbol L22 represents the distribution of the second beam L22 at room temperature RT. For example, the second wavelength λ22 is about 1260 nm. The second-from-left box does not overlap the frequency response F132. In other words, the second wavelength λ22 of the second beam L22 is different from the second filtering wavelength λ32. As such, the second beam L22 will be filtered out by the second I/O component 132 and no beam would be transmitted by the second I/O component 132.

The second-from-right box denoted with the symbol L23 represents the distribution of the third beam L23 at room temperature RT. For example, the third wavelength λ23 is about 1280 nm. The second-from-right box does not overlap the frequency response F133. In other words, the third wavelength λ23 of the third beam L23 is different from the third filtering wavelength λ33. As such, the third beam L23 will be filtered out by the third I/O component 133 and no beam would be transmitted by the third I/O component 133.

The rightmost box denoted with the symbol L24 represents the distribution of the fourth beam L24 at room temperature RT. For example, the fourth wavelength λ24 is about 1300 nm. The rightmost box does not overlap the frequency response F134. In other words, the fourth wavelength λ24 of the fourth beam L24 is different from the fourth filtering wavelength λ34. As such, the fourth beam L24 will be filtered out by the fourth I/O component 134 and no beam would be transmitted by the fourth I/O component 134.

The calibration system of the present disclosure can calibrate, adjust, and modulate the first wavelength λ21 of the first beam L21, the second wavelength λ22 of the second beam L22, the third wavelength λ23 of the third beam L23, and the fourth wavelength λ24 of the fourth beam L24. The calibration, adjustment, or modulation thereof can be conducted simultaneously or at separate times in a relatively short interval. The calibration system includes, for example, the optical sensor 3, the electrical device 4, the thermal sensor 5, and the plurality of heating devices 21, 22, 23. and 24. The second channel 122 is applied with the heating device (or the second heating device) 22; the third channel 123 is applied with the heating device (or the third heating device) 23; the fourth channel 124 is applied with the heating device (or the fourth heating device) 24. The second heating device 22 is thermally coupled with the second channel 122; the third heating device 23 is thermally coupled with the third channel 123; the fourth heating device 24 is thermally coupled with the fourth channel 124. The heating devices 21, 22, 23, and 24 are configured to change the temperature of the channels 121, 122, 123, and 124, respectively. The heating devices 22, 23, and 24 may he similar to or different from the first heating device 21.

Referring back to FIG. 1, in response to the first signal S11 from the first optical sensor 3, the first electrical device 4 is configured to generate the first control signal CS11 to one or more of the plurality of the heating devices (e.g., the first heating device 21, the second heating device 22, the third heating device 23, and/or the fourth heating device 24). The first electrical device 4 is configured to control one or more of the heating devices 21, 22, 23, and 24. One or more of the heating devices 21, 22, 23, and 24 may be configured to change the temperature of one or more of the channels 121, 122, 123, and 124 with a second delta temperature value ΔT2. The second delta temperature value ΔT2 may be any figure. For the purpose of this explanation, the second delta temperature value ΔT2 is assumed to be a positive figure that is smaller than the first delta temperature value ΔT1.

Figure 4:
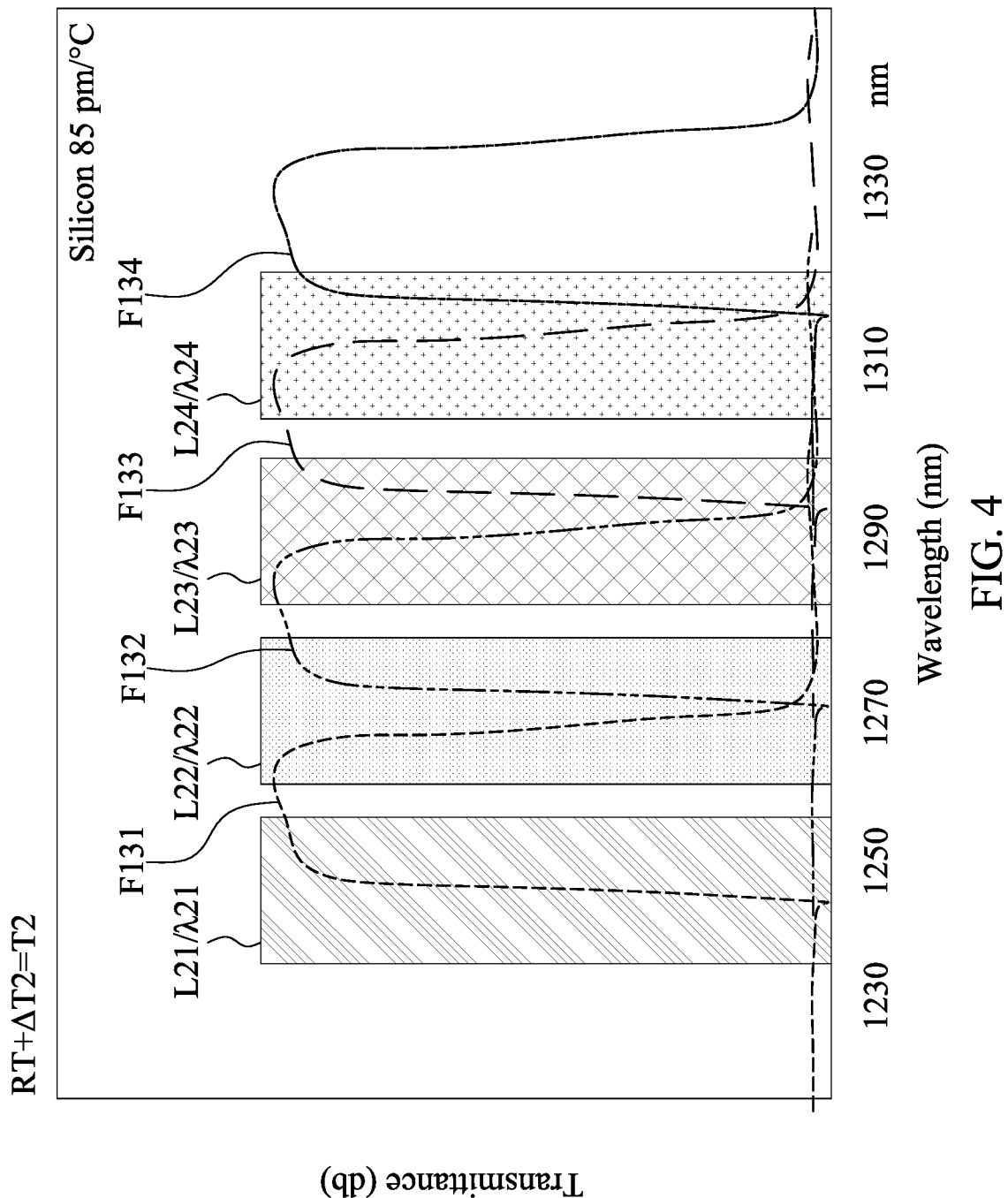
FIG. 4 is a graph illustrating transmittance versus wavelength of the optical signals of a plurality of channels of a demultiplexer, in accordance with some embodiments.

FIG. 4 is a graph illustrating transmittance versus wavelengths of multiple beams (e.g., the first, second, third, and fourth beams 21, 22, 23, and 24 of the multiple channels (e.g., the first, second, third, and fourth channels 121, 122, 123, and 124) of the demultiplexer 1, in accordance with some embodiments. As shown in FIG. 4, the leftmost box L21, the second-from-left box L22, the second-from-right box L23, and the rightmost box L24 are the distribution of the wavelength of the plurality of beams L21, L22, L23, and L24 when the plurality of channels 121, 122, 123, and 124 is at a second temperature T2, which equals the room temperature RT plus the second delta temperature value ΔT2. The plurality of channels 121, 122, 123, and 124 may be made of silicon. Since these channels have the same wavelength variation per temperature (e.g., about 85 pm/° C.), the wavelengths λ21, λ22, λ23, and λ24 of the plurality of beams L21, L22, L23, and L24 of FIG. 4 are respectively shifted relative to those of FIG. 3 with the same amount.

As shown in FIG. 4, the distribution of each of the beams L21, L22, L23, and L24 is partially covered by the bandwidth of the corresponding frequency response F131, F132, F133, and F134. In other words, each of the wavelengths λ21, λ22, λ23, and λ24 of the plurality of beams L21, L22, L23, and L24 is different from the corresponding filtering wavelength of the corresponding I/O component. For example, the difference between each of the wavelengths of the plurality of beams L21, L22, L23, L24 and the corresponding filtering wavelength is greater than the offset as discussed above. As such, the first beam L21 received by the first optical sensor 3 may not have energy exceeding the threshold energy value TE1. The first optical sensor 3 will continuously generate the first signal S11 to the first electrical device 4. In response to the first signal S11, the first electrical device 4 is configured to control one or more of the plurality of heating devices 21, 22, 23, and 24 to heat one or more of the plurality of channels 121, 122, 123, and 124. One or more of the heating devices 21, 22, 23, 24 may be configured to change the temperature of one or more of the channels 121, 122, 123, 124 with the first delta temperature value ΔT1.

Figure 5:
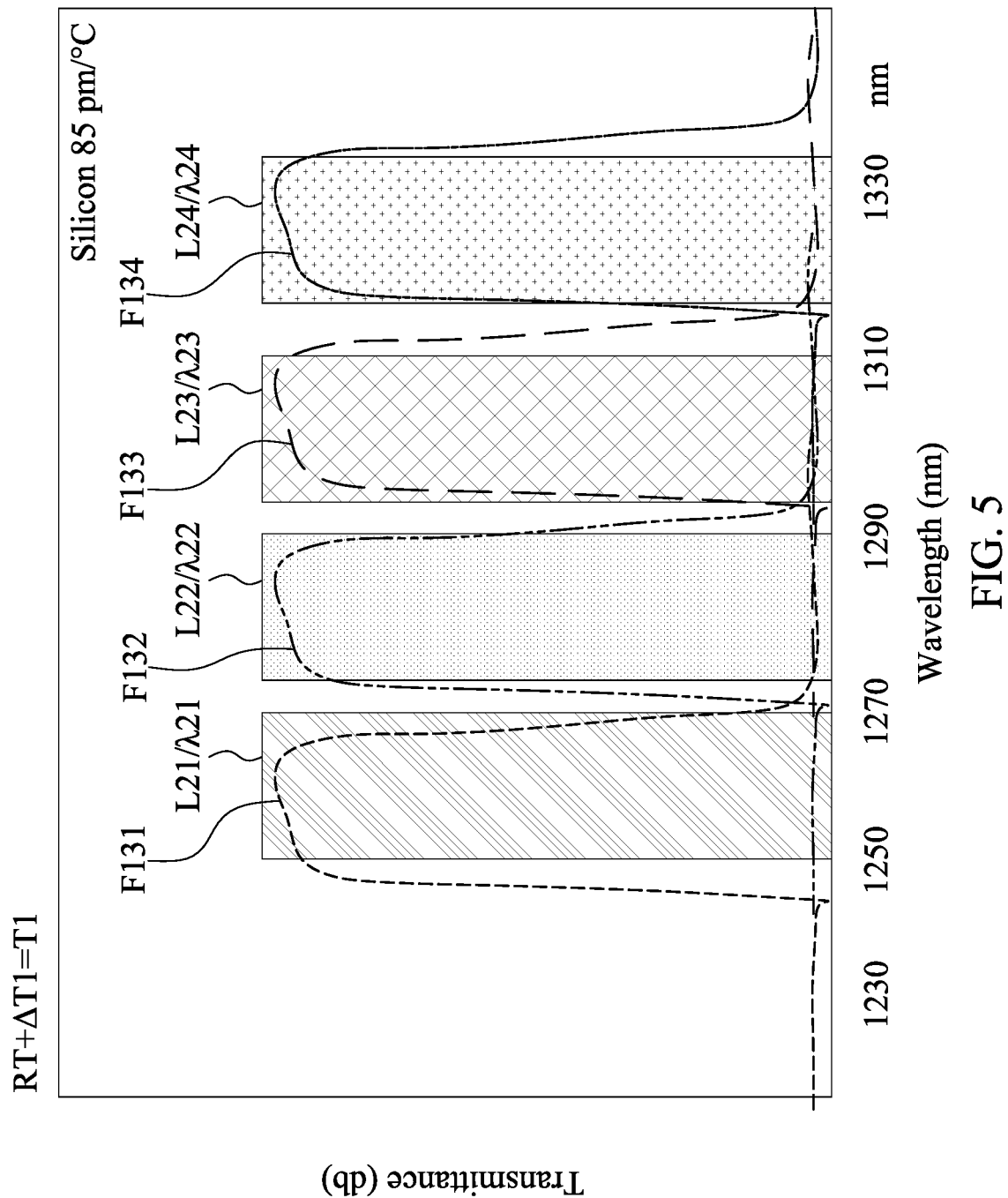
FIG. 5 is a graph illustrating transmittance versus wavelength of the optical signals of a plurality of channels of a demultiplexer, in accordance with some embodiments.

FIG. 5 is a graph illustrating transmittance versus wavelengths of multiple beams (e.g., the first, second, third, and fourth beams 21, 22, 23, and 24 of the multiple channels (e.g., the first, second, third, and fourth channels 121, 122; 123, and 124) of the demultiplexer 1, in accordance with some embodiments. As shown in FIG. 5, the leftmost box L21, the second-from-left box L22, the second-from-right box L32, and the rightmost box L24 are the distribution of the wavelength of the plurality of beams L21, L22, L23, and L24 when the plurality of channels 121; 122, 123, and 124 is at the first temperature T1, which equals the room temperature RT plus the first delta temperature value ΔT1. The wavelengths λ21, λ22, 223, 224 of the plurality of beams L21, L22, L23, and L24 of FIG. 5 are respectively shifted relative to those of FIG. 3 with the same amount.

As shown in FIG. 5, the wavelengths of the beams L21, L22, L23, and L24 are adjusted, such that the distribution of each of the beams L21, L22, L23, and L24 is covered by the bandwidth of the corresponding frequency response (e.g., one of the frequency responses F131, F132, F133, and F134). In other words, each of the wavelengths λ21, λ22, λ23, and λ24 of the beams L21, L22, L23, and L24 meets the corresponding filtering wavelength of the corresponding I/O component (e.g., one of the filtering wavelengths λ31, λ32, λ33, and λ34 of the I/O components 131, 132, 133, and 134). Furthermore, the second wavelength λ22 of the second beam L22 meets the second filtering wavelength λ32 of the second I/O component 132; the third wavelength λ23 of the third beam L23 meets the third filtering wavelength λ33 of the third I/O component 133; the fourth wavelength λ24 of the fourth beam L24 meets the fourth filtering wavelength λ34 of the fourth I/O component 134. In some embodiments, each of the wavelengths λ21, λ22, λ23, and λ24 may be substantially equal to the corresponding filtering wavelength. For example, the difference between each of the wavelengths λ21, λ22, λ23, and λ24 and the corresponding filtering wavelength is smaller than the offset as discussed above.

The first I/O component 131 is configured to transmit the first beam L21 when the first wavelength λ21 meets the first filtering wavelength λ31. Subsequently, the first beam L21 is transmitted to the optical sensor 3 through the optical fiber. When the optical sensor 3 receives the first beam L21 having energy that exceeds the threshold energy value TE1, the optical sensor 3 generates the second signal S12 and transmits it to the first electrical device 4. In response to the second signal S12, the electrical device 4 transmits the second control signal CS12 to the heating devices 21, 22, 23, and 24. In response to the second signal S12, the electrical device 4 is configured to control the heating devices 21, 22, 23, and 24 (e.g., through the second control signal CS12) to stop heating or maintain the temperature of the channels 121, 122, 123, and 124.

Referring again to FIG. 5, the distribution of the beams L21, L22, L23, and. L24 mainly overlaps the frequency response of the I/O components 131, 132, 133, and 134, respectively. The beams L21, 122, L23, and L24 with the modulated/adjusted/calibrated wavelengths λ21, 222,223, and 224 carry the correct data and can be transmitted to the next stage through optical fibers (not shown). The optical sensor 3, the electrical device 4, and the heating devices 21, 22, 23, and 24 of the calibration system provide a fast, precise, and simultaneous way to calibrate, adjust, or modulate the wavelengths λ21, λ22, λ23, and λ24 of the beams L21, L22, L23, and L24 transmitted in the channels 121, 122, 123, and 124. The time needed for the calibration, adjustment or modulation of the channels 121, 122, 123, and 124 can he significantly reduced.

The number of channels as illustrated here is for the purpose of this explanation. The number of channels should not be considered as a limit to the present disclosure. For example, the number of channels can be more or less than 4. Correspondingly, the demultiplexer may divide the input beam L11 into more or less than 4 beams with different wavelengths.

Figure 6:
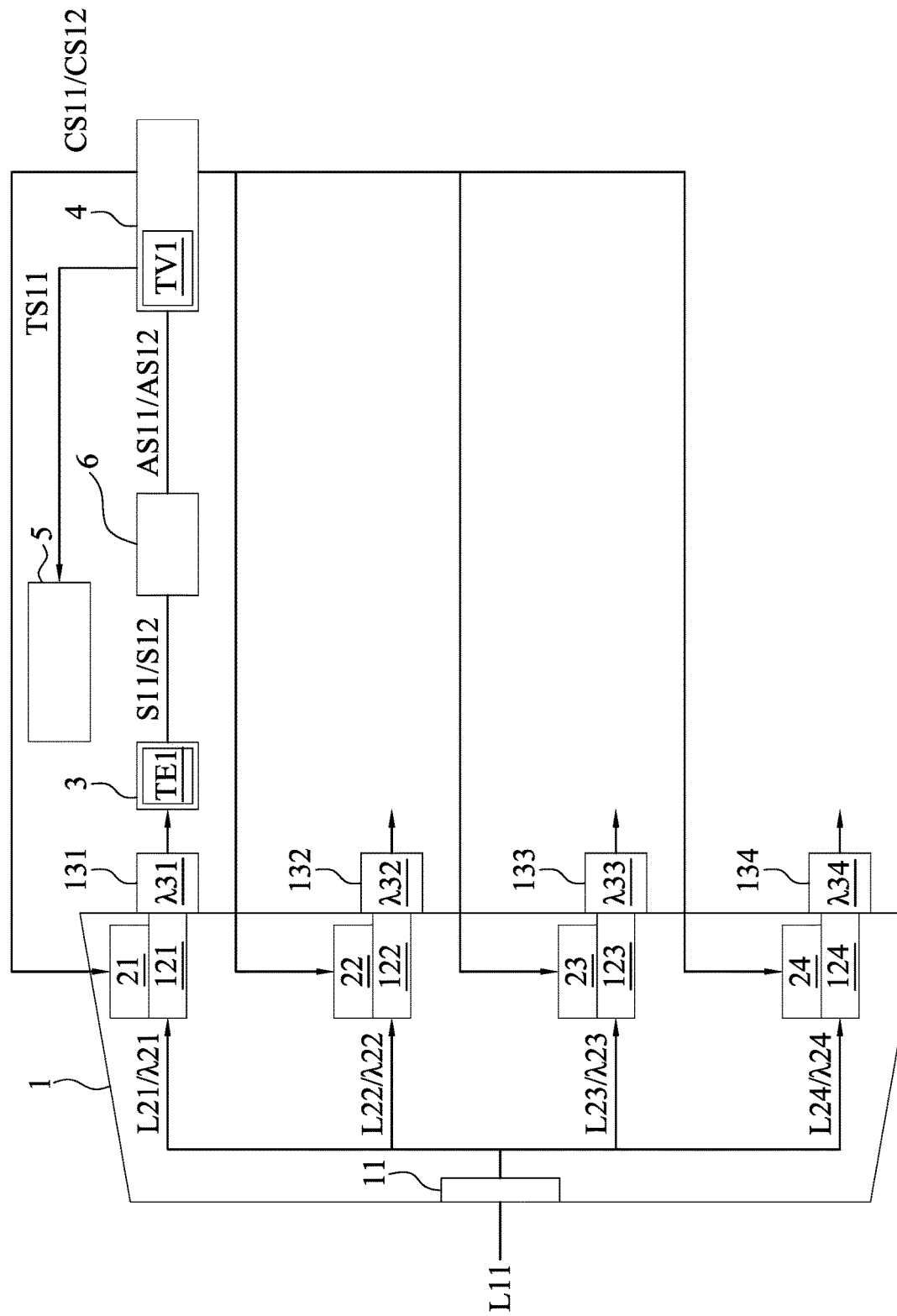
FIG. 6 is a block diagram of a WDM system, in accordance with some embodiments.

FIG. 6 is a block diagram of a WDM system 100A, in accordance with some embodiments. The WDM system 100A of FIG. 6 is similar to the WDM system 100 of FIG. 1. The difference therebetween will be discussed in detail.

The WDM system 100A further includes a first amplifier 6 connected between the first optical sensor 3 and the first electrical device 4. The first amplifier 6 is configured to amplify the first signal S11 and/or the second signal S12 from the first optical sensor 3. In response to the first signal S11 or the second signal S12, the first amplifier 6 is configured to generate a first amplified signal AS11 or a second amplified signal AS12 and transmit it to the first electrical device 4. The first electrical device 4 may be configured to compare the first amplified signal AS11 or the second amplified signal AS12 with another threshold value. The first amplifier 6 may prevent the first electrical device 4 from being influenced by noise when the first electrical device 4 determines whether to control one or more of the heating devices to heat or stop heating or maintain the temperature of the channels.

Figure 7:
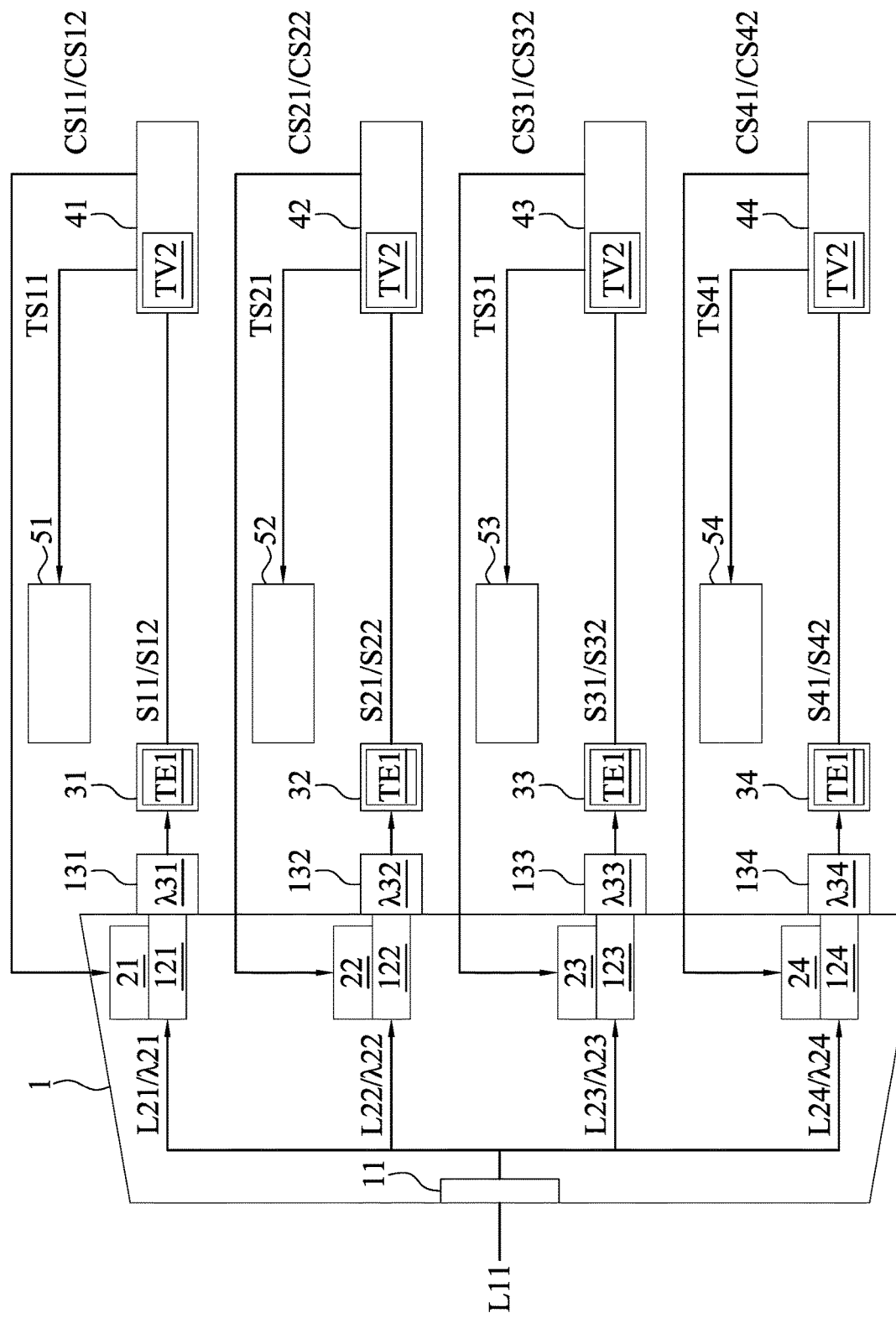
FIG. 7 is a block diagram of a WDM system, in accordance with some embodiments.

FIG. 7 is a block diagram of a WDM system 200, in accordance with some embodiments. The WDM system 200 of FIG. 7 is similar to the WDM system 100 of FIG. 1, The difference therebetween will be discussed in detail.

The WDM system 200 of FIG. 7 further includes a plurality of optical sensors 31, 32, 33, and 34, a plurality of electrical devices 41, 42, 43, and 44, and a plurality of thermal sensors 51, 52, 53. and 54. The optical sensor (or the first optical sensor) 31 is communicated with the first channel 121 of the demultiplexer 1. The first optical sensor 31 is connected to the electrical device (or first electrical device) 41. The first electrical device 41 is connected to the first heating device 21 and the thermal device (or the first thermal device) 51. The first optical sensor 31, the first electrical device 4, and the first thermal sensor 51 are similar to the first optical sensor 3, the first electrical device 4, and the first thermal sensor 5, respectively, of FIG. 1 in terms of their configurations and characteristics. The difference is that the first electrical device 41 is not electrically connected to the heating devices 22, 23, and 24.

The optical sensor (or the second optical sensor) 32 is communicated with the second channel 122 of the demultiplexer 1. The second optical sensor 32 is connected to the electrical device (or second electrical device) 42. The second electrical device 42 is connected to the second heating device 22 and the thermal device (or the second thermal device) 52.

The optical sensor (or the third optical sensor) 33 is communicated with the third channel 123 of the demultiplexer 1, The third optical sensor 33 is connected to the electrical device (or third electrical device) 43. The third electrical device 43 is connected to the third heating device 23 and the thermal device (or the third thermal device) 53.

The optical sensor (or the fourth optical sensor) 34 is communicated with the fourth channel 123 of the demultiplexer 1. The fourth optical sensor 34 is connected to the electrical device (or fourth electrical device) 44. The fourth electrical device 44 is connected to the fourth heating device 24 and the thermal device (or the fourth thermal device) 54.

The calibration system as illustrated in FIG. 7 includes the plurality of heating devices 21, 22, 23, and 24, the plurality of optical sensors 31, 32, 33, and 34, and the plurality of electrical devices 41, 42, 43, and 44.

The calibration (or adjustment, modulation) of the first wavelength $\lambda 21$ of the first beam L21 performed by the first optical sensor 31, the first electrical device 41, the first heating device 21 of the calibration system of FIG. 7 is similar to the calibration performed by the calibration system of FIG. 1.

The calibration of the wavelengths of the transmitted beams L21, L22, L23, and L24 can be performed individually by the corresponding optical sensor, electrical device, and healing device, In some embodiments, the first wavelength $\lambda 21$ of the first beam L21 can be adjusted by the first optical sensor 31, the first electrical device 41, and the first heating device 21 of the calibration system. The second wavelength $\lambda 22$ of the second beam L22 can be adjusted by the second optical sensor 32, the second electrical device 42, and the second heating device 22 of the calibration system. The third wavelength $\lambda 23$ of the third beam L23 can be adjusted by the third optical sensor 33, the third electrical device 43, and the third heating device 23 of the calibration system. The fourth wavelength $\lambda 24$ of the fourth beam L24 can be adjusted by the fourth optical sensor 34, the fourth electrical device 44, and the fourth heating device 24 of the calibration system.

Figure 8:
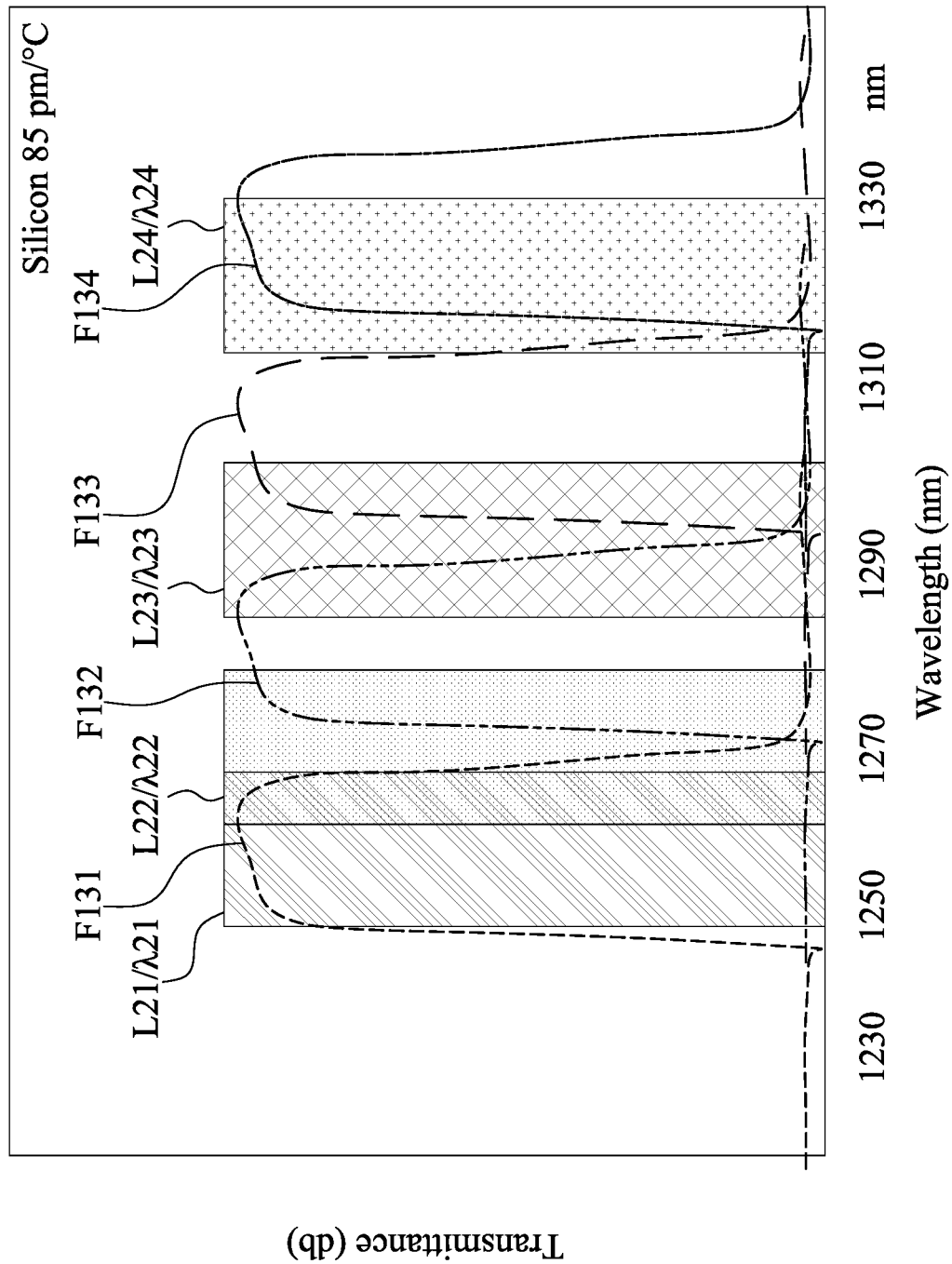
FIG. 8 is a graph illustrating transmittance versus wavelength of the optical signals of a plurality of channels of a demultiplexer, in accordance with some embodiments.

FIG. 8 is a graph illustrating transmittance versus wavelengths of multiple beams (e.g., the first, second, third, and fourth beams 21, 22, 23, and 24) of the multiple channels (e.g., the first, second, third, and fourth channels 121, 122, 123, and 124) of the demultiplexer 1, in accordance with some embodiments.

As shown in FIG. 8, the leftmost box, which is denoted as L21, represents the first wavelength $\lambda 21$ of the first beam L21 when the first channel 121 is at a temperature, which equals the room temperature RT plus a delta temperature value $\Delta T11$, The second-from-left box, which is denoted as L22, represents the second wavelength $\lambda 22$ of the second beam L22 when the second channel 122 is at a temperature, which equals the room temperature RT plus a delta temperature value $\Delta T12$. The second-from-right box, which is denoted as L23, represents the third wavelength $\lambda 23$ of the third beam L23 when the third channel 123 is at a temperature, which equals the room temperature RT plus a delta temperature value $\Delta T13$. The rightmost box, which is denoted as 122, represents the fourth wavelength $\lambda 24$ of the fourth beam L24 when the fourth channel 124 is at a temperature, which equals the room temperature RT plus a delta temperature value $\Delta T14$. The refractive index of one of the channels 121, 122, 123, and 124 is shifted based on the corresponding delta temperature value $\Delta T11$, $\Delta T12$, $\Delta T13$, or $\Delta T14$. The delta temperature values $\Delta T11$, $\Delta T12$, $\Delta T13$, and $\Delta T14$ are independent. The delta temperature values $\Delta T11$, $\Delta T12$, $\Delta T13$, and $\Delta T14$ are different from each other. Therefore, the wavelengths $\lambda 21$, $\lambda 22$, $\lambda 23$, and $\lambda 24$ of the plurality of beams L21, L22, L23, and L24 are shifted relative to those of FIG. 3 based on different delta temperature values $\Delta T11$, $\Delta T12$, $\Delta T13$, and $\Delta T14$.

As shown in FIG. 8, the distribution of each of the beams L21, L22, L23, and L24 is partially covered by the bandwidth of the corresponding frequency response F131, F132, F133, and F134. In other words, each of the wavelengths $\lambda 21$, $\lambda 22$, $\lambda 23$, and $\lambda 24$ of the plurality of beams L21, L22, L23, and L24 is different from the corresponding filtering wavelength of the corresponding I/O component. As such, the first beam L21 received by the first optical sensor 31 may not have energy exceeding the threshold energy value TE1; the second beam L22 received by the second optical sensor 32 may not have energy exceeding the threshold energy value TE1; the third beam L23 received by the third optical sensor 33 may not have energy exceeding the threshold energy value TE1; the fourth beam L24 received by the fourth optical sensor 34 may not have energy exceeding the threshold energy value TE1. The first optical sensor 31 will generate the signal S11 and transmit it to the first electrical device 41; the second optical sensor 32 will generate a signal S21 and transmit it to the second electrical device 42; the third optical sensor 33 will generate a signal S31 and transmit it to the third electrical device 43; the fourth optical sensor 34 will generate a fourth signal S41 and transmit it to the fourth electrical device 44. In response to the signal S11, the first electrical device 31 is configured to generate the control signal CS11 and transmit it to the first heating device 21 and configured to control the first heating device 21 to heat the first channel 121. In response to the signal S21, the second electrical device 32 is configured to generate a control signal CS21 and transmit it to the second heating device 22 and control the second heating device 22 to heat the second channel 122. In response to the signal S31, the third electrical device 33 is configured to generate a control signal CS31 and transmit it to the third heating device 23 and control the third heating device 23 to heat the third channel 123. In response to the signal S41, the fourth electrical device 34 is configured to generate a control signal CS41 and transmit it to the fourth heating device 24 and control the fourth heating device 24 to heat the fourth channel 124. Therefore, the first, second, third, and fourth electrical devices 31, 32, 33, and 34 are configured to independently control the plurality of heating devices 21, 22, 23, and 24, respectively, and to heat the plurality of channels 121, 122, 123, and 124.

Figure 9:
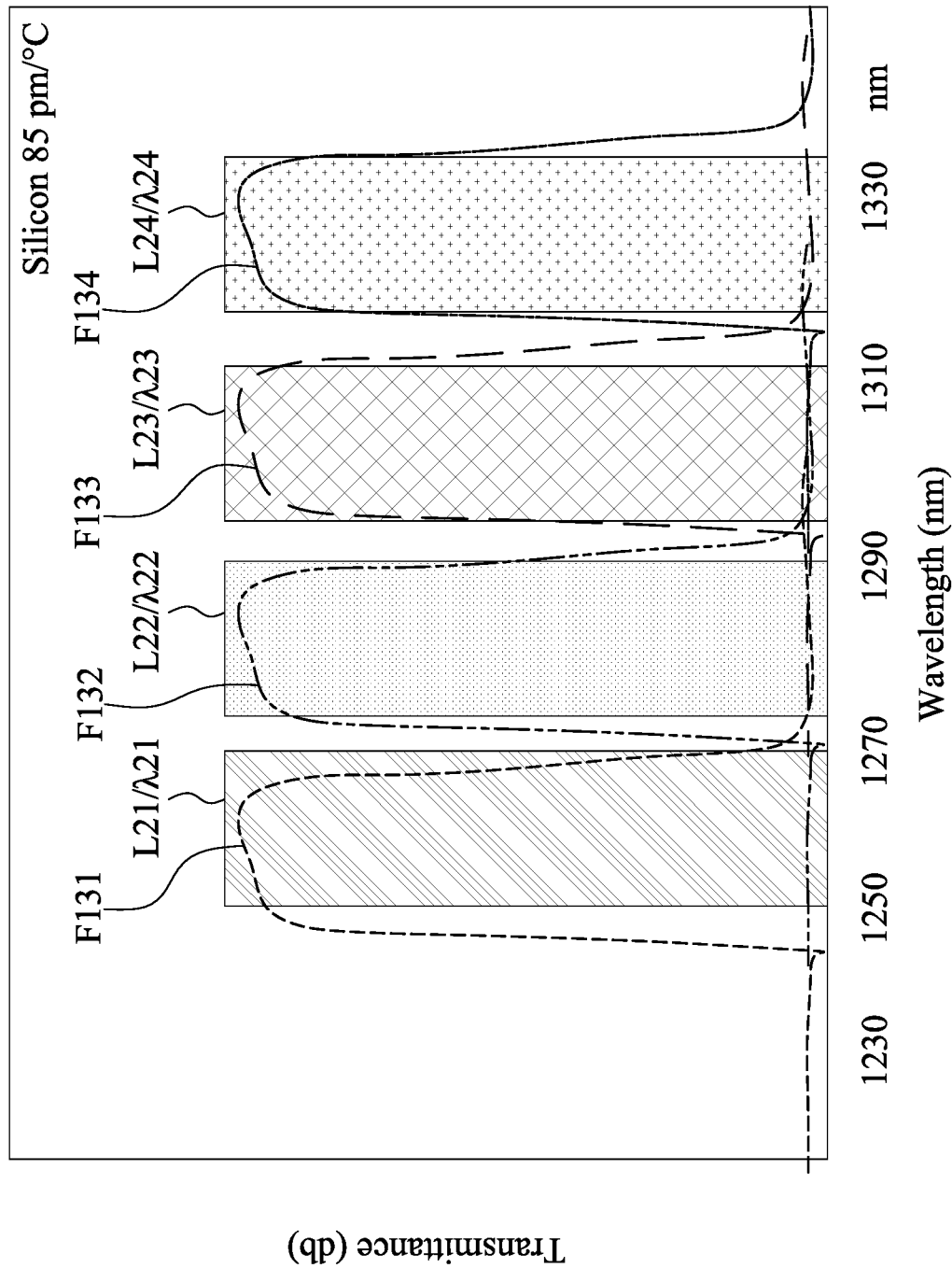
FIG. 9 is a graph illustrating transmittance versus wavelength of the optical signals of a plurality of channels of a demultiplexer, in accordance with some embodiments.

FIG. 9 is a graph illustrating transmittance versus wavelengths of multiple beams (e.g., the first, second, third, and fourth beams 21, 22, 23, and 24) of the multiple channels (e.g., the first, second, third, and fourth channels 121, 122, 123, and 124) of the demultiplexer 1, in accordance with some embodiments.

As shown in FIG. 9, the first heating device 21 may be configured to change the temperature of the first channel 121 with a delta temperature value $\Delta T21$. The leftmost box, which is denoted as L21, represents the first wavelength $\lambda 21$ of the first beam L21 when the first channel 121 is at a temperature, which equals the room temperature RT plus the delta temperature value $\Delta T21$.

The second heating device 22 may be configured to change the temperature of the second channel 122 with a delta temperature value $\Delta T22$. The second-from-left box, which is denoted as L22, represents the second wavelength $\lambda 22$ of the second beam L22 when the second channel 122 is at a temperature, which equals the room temperature RT plus the delta temperature value $\Delta T22$.

The third heating device 23 may be configured to change the temperature of the third channel 123 with a delta temperature value $\Delta T23$. The second-from-right box, which is denoted as L23, represents the third wavelength $\lambda 23$ of the third beam L23 when the third channel 123 is at a temperature, which equals the room temperature RT plus the delta temperature value ΔT23.

The fourth heating device 24 may be configured to change the temperature of the fourth channel 124 with a delta temperature value ΔT24. The rightmost box, which is denoted as L22, represents the fourth wavelength λ24 of the fourth beam L24 when the fourth channel 124 is at a temperature, which equals the room temperature RT plus the delta temperature value ΔT24. The delta temperature values ΔT21, ΔT22, ΔT23, and ΔT24 are independent. The delta temperature values ΔT21, ΔT22, Δ123, and ΔT24 are different from each other.

As shown in FIG. 9, the wavelengths of the beams L21, L22, L23, and L24 are adjusted, such that the distribution of each of the beams L21, L22, L23, and L24 is covered by the bandwidth of the corresponding frequency response (e.g., one of the frequency responses F131, F132, F133, and F134). In other words, each of the wavelengths λ21, λ22, λ23, and λ24 of the beams L21, L22, L23, and L24 meets the corresponding filtering wavelength of the corresponding I/O component (e.g., one of the filtering wavelengths λ31, λ32, λ33, and λ34 of the I/O components 131, 132, 133, and 134).

The first I/O component 131 is configured to transmit the first beam L21 when the first wavelength λ21 meets the first filtering wavelength λ31. Subsequently, the first beam L21 is transmitted to the first optical sensor 31 through the optical fiber. When the first optical sensor 31 receives the first beam L21 having energy that exceeds the threshold energy value TE1, the first optical sensor 31 generates the second signal S12 and transmits it to the first electrical device 41. In response to the second signal S12, the first electrical device 41 transmits the control signal CS12 to the first heating device 21. In response to the second signal S12, the first electrical device 41 is configured to control the first heating device 21 (e.g., through the control signal CS12) to stop heating or maintain the temperature of the first channel 121.

The second I/O component 132 is configured to transmit the second beam L22 when the second wavelength λ22 meets the second filtering wavelength λ32. Subsequently, the second beam L22 is transmitted to the second optical sensor 32 through the optical fiber When the second optical sensor 32 receives the second beam L22 having energy that exceeds the threshold energy value TE1 the second optical sensor 32 generates a signal S22 and transmits it to the second electrical device 42. The second electrical device 42 is configured to compare the values of signals S21 and S22 with the threshold value TV1 in a way similar to those as illustrated in FIG. 1. In response to the signal S22, the second electrical device 42 transmits a control signal CS22 to the second heating device 22. In response to the signal S22, the second electrical device 42 is configured to control the second heating device 22 (e.g., through the control signal CS22) to stop heating or maintain the temperature of the second channel 122.

The third I/O component 133 is configured to transmit the third beam L23 when the third wavelength λ23 meets the third filtering wavelength λ33. Subsequently, the third beam L23 is transmitted to the third optical sensor 33 through the optical fiber. When the third optical sensor 33 receives the third beam L23 having energy that exceeds the threshold energy value TE1, the third optical sensor 33 generates a signal S32 and transmits it to the third electrical device 43. The third electrical device 43 is configured to compare the values of signals S31 and S32 with the threshold value TV1 in a way similar to those as illustrated in FIG. 1. In response to the signal S32, the third electrical device 43 transmits a control signal CS32 to the third healing device 23. in response to the signal S32, the third electrical device 43 is configured to control the third heating device 23 (e.g., through the control signal CS32) to stop heating or maintain the temperature of the third channel 123.

The fourth I/O component 134 is configured to transmit the fourth beam L24 when the fourth wavelength λ24 meets the fourth filtering wavelength λ34. Subsequently, the fourth beam L24 is transmitted to the fourth optical sensor 34 through the optical fiber. When the fourth optical sensor 34 receives the fourth beam L24 having energy that exceeds the threshold energy value TE1, the fourth optical sensor 34 generates the signal S42 and transmits it to the fourth electrical device 44. The fourth electrical device 44 is configured to compare the values of signals S41 and S42 with the threshold value TV1 in a way similar to those as illustrated in FIG. 1. In response to the signal S42, the fourth electrical device 44 transmits a control signal CS42 to the fourth heating device 24. In response to the signal S42, the fourth electrical device 44 is configured to control the fourth heating device 24 (e.g., through the control signal CS42) to stop heating or maintain the temperature of the fourth channel 124.

In some embodiments, the I/O components 131, 132, 133, and 134 may have different threshold energy values. In some embodiments, the electrical devices 41, 42, 43, and 44 may have different threshold values.

Referring again to FIG. 9, the distribution of the beams L21, L22, L23, and L24 mainly overlaps the frequency response of the I/O components 131, 132, 133, and 134, respectively. The beams L21, L22, L23, and L24 with the modulated/adjusted/calibrated wavelengths λ21, λ22, λ23, and λ24 carry the correct data and can be transmitted to the next stage through optical fibers (not shown). The optical sensors 31, 32, 33, and 34, the electrical devices 41, 42, 43, and 44, and the heating devices 21, 22, 23, and 24 of the calibration system provide a fast, precise, and independent way to calibrate, adjust, or modulate the wavelengths λ21, λ22, λ23, and λ24 of the beams L21, L22, L23, and L24 transmitted in the channels 121, 122, 123, and 124. The time needed for the calibration, adjustment or modulation of the channels 121, 122, 123, and 124 can be significantly reduced.

Since the calibration system of FIG. 9 can independently calibrate the wavelengths of the transmitted beams through independent calibration, adjustment, or modulation of the temperature of channels, the adjustment of the wavelengths of the transmitted beams can be more precise. The delta temperature values ΔT21, ΔT22, ΔT23 are independent, which means that the time needed for the adjustment of the wavelengths of the transmitted beams may be different.

The first electrical device 41 is configured to generate an electrical signal TS11 and transmit it to the thermal sensor (or a first thermal sensor) 51. In response to the first electrical signal TS11, the first thermal sensor 51 is configured to measure the temperature of the first channel 21. The first thermal sensor 51 may be connected to the first channel 121. The first thermal sensor 51 may have a component thermally connected to the first channel 121. A user may be aware of the temperature of the first channel 121 of the demultiplexer through the first thermal sensor 51.

The second electrical device 42 is configured to generate an electrical signal TS21 and transmit it to the thermal sensor (or a second thermal sensor) 52. In response to the second electrical signal TS21, the second thermal sensor 52 is configured to measure the temperature of the second channel 22. The second thermal sensor 52 may be connected to the second channel 122. The second thermal sensor 52 may have a component thermally connected to the second channel 122. A user may be aware of the temperature of the second channel 122 of the demultiplexer through the second thermal sensor 52.

The third electrical device 43 is configured to generate an electrical signal TS31 and transmit it to the thermal sensor (or a third thermal sensor) 53. In response to the third electrical signal TS31, the third thermal sensor 53 is configured to measure the temperature of the third channel 23. The third thermal sensor 53 may be connected to the third channel 123. The third thermal sensor 53 may have a component thermally connected to the third channel 123. A user may be aware of the temperature of the third channel 123 of the demultiplexer through the third thermal sensor 53.

The fourth electrical device 44 is configured to generate an electrical signal TS41 and transmit it to the thermal sensor (or a fourth thermal sensor) 54, In response to the fourth electrical signal TS41, the fourth thermal sensor 54 is configured to measure the temperature of the fourth channel 24. The fourth thermal sensor 54 may be connected to the fourth channel 124, The fourth thermal sensor 54 may have a component thermally connected to the fourth channel 124. A user may be aware of the temperature of the fourth channel 124 of the demultiplexer through the fourth thermal sensor 54.

Figure 10:
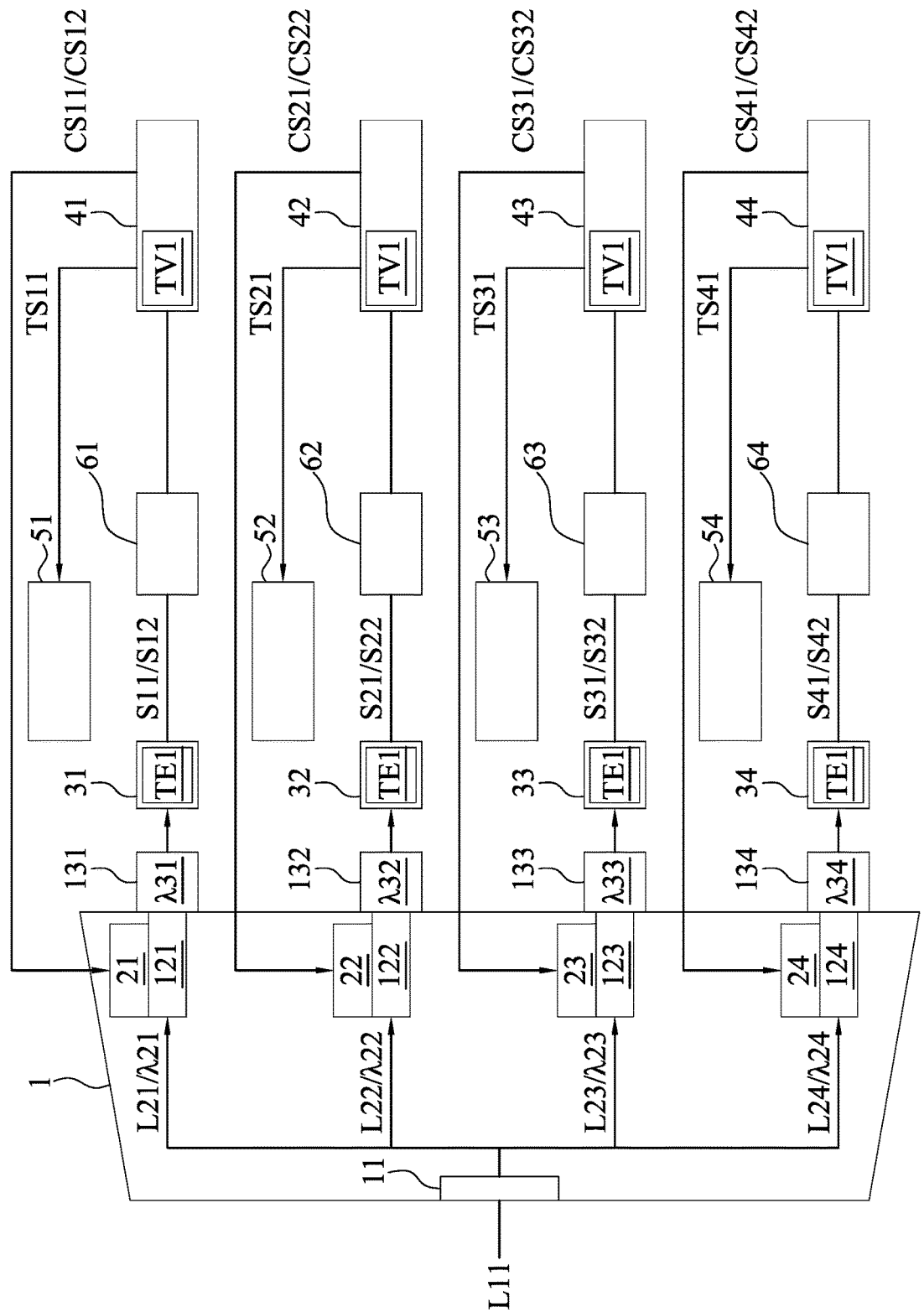
FIG. 10 is a block diagram of a WDM system, in accordance with some embodiments.

FIG. 10 is a block diagram of a WDM system 200A, in accordance with some embodiments. The WDM system 200A of FIG. 10 is similar to the WDM system 200 of FIG. 7. The difference therebetween will be discussed in detail.

The WDM system 200A further includes a first amplifier 61 connected between the first optical sensor 31 and the first electrical device 41, a second amplifier 62 connected between the second optical sensor 32 and the second electrical device 42, a third amplifier 63 connected between the third optical sensor 33 and the third electrical device 43, and a fourth amplifier 64 connected between the fourth optical sensor 34 and the fourth electrical device 44. The amplifiers 61, 62, 63, and 64 are configured to amplify the signals from the optical sensors 31, 32, 33, and 34, respectively. The amplifiers 61, 62, 63, and 64 may prevent the electrical devices 41, 42, 43, and 44 from being influenced by noise when the electrical devices 41, 42, 43, and 44 determine whether to control one or more of the heating devices to heat or stop heating or maintain the temperature of the channel.

Figure 11:
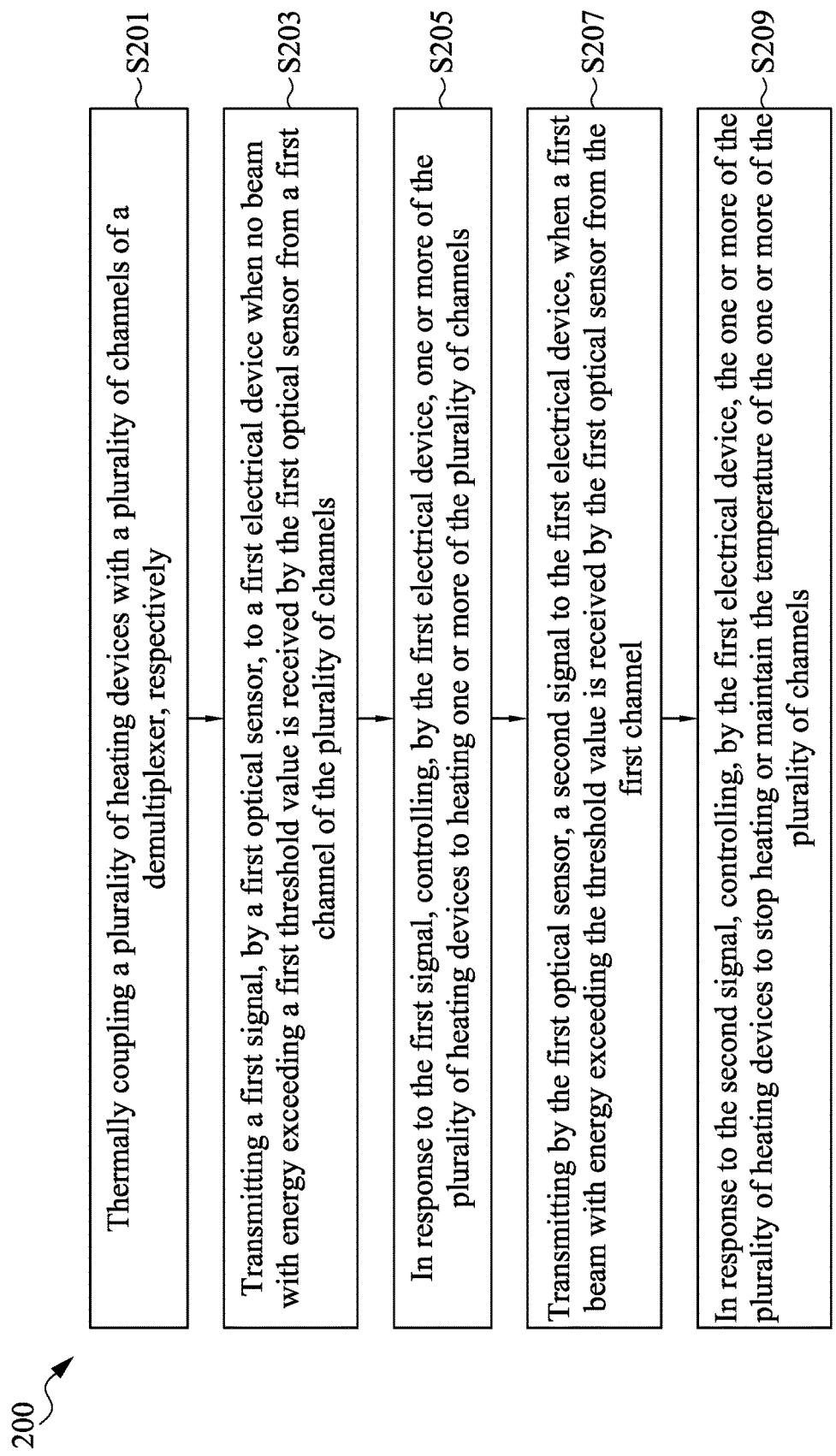
FIG. 11 is a flowchart showing a calibrating method for WDM, in accordance with some embodiments.

FIG. 11 is a flowchart showing a method 200 for a calibrating method for WDM, in accordance with some embodiments of the present disclosure, In some embodiments, this method can be conducted by a calibration system. In some embodiments, the method can be performed by the calibration system illustrated in FIGS. 1 and 6.

In operation S201, the method 200 begins with thermally coupling a plurality of heating devices with a plurality of channels of a demultiplexer. For example, the heating device 21 is thermally coupled with the first channel 121.

In operation S203, the method 200 continues with generating a first signal (e.g., the first signal S11), by a first optical sensor (e.g., the first optical sensor 3), to a first electrical device (e.g., the first electrical device 4), when no beam with energy exceeding a first threshold value (e.g., the threshold energy value TE1) is received by the first optical sensor from a first channel (e.g., the first channel 121) of the plurality of channels. In some embodiments, the first signal may have a first value, and the first value may be logic low In operation S205, the method 200 continues with, in response to the first signal, controlling, by the first electrical device, one or more of the plurality of heating devices (e.g., the heating devices 21, 22, 23, and 24) to heat one or more of the plurality of channels (e.g., the channels 121, 122, 123, and 124). in some embodiments, the first electrical device may be configured to determine whether the first value of the first signal is lower than a second threshold value (e.g., the threshold value TV1). In some embodiments, when the first value is lower than the second threshold value, a first control signal (e.g., the first control signal CS11) is transmitted, by the first electrical device, to one or more of the plurality of heating devices. In some embodiments, in response to the first control signal, the temperature of one or more of the plurality of channels is changed by the plurality of heating devices with a first delta temperature value (e.g., the first delta temperature value ΔT1). In some embodiments, the refractive indexes of one or more of the plurality of channels change in response to the first delta temperature value. In some embodiments, the wavelengths (wavelengths λ21, λ22, λ23, and λ24) of beams transmitted by the one or more of the plurality of channels are shifted with a same value based on the first delta temperature value.

In operation S207, the method 200 continues with transmitting, by the first optical sensor, a second signal (e.g., the second signal S12), to the first electrical device, when a first beam (e.g., the first beam L21) with energy exceeding the threshold value is received by the first optical sensor from the first channel. In some embodiments, the first value of the first signal and a second value of the second signal are different.

In operation S209, the method 200 continues with, in response to the second signal, controlling, by the first electrical device, the one or more of the plurality of heating devices to stop heating or maintain the temperature of the one or more of the plurality of channels. In some embodiments, the second value is the same as the second threshold value. In some embodiments, in response to the second signal, the first electrical device transmits a second control signal (e.g., the second control signal CS12) to one or more of the plurality of heating devices. In some embodiments, in response to the second control signal, the one or more of the plurality of heating devices is configured to maintain the temperature of the one or more of the plurality of channels with a first temperature value (e.g., the temperature T1).

The method 200 is merely an example, and is not intended to limit the present disclosure beyond what is explicitly recited in the claims. Additional operations can be provided before, during, or after each operation of the method 200, and some operations described can be replaced, eliminated, or moved around for additional embodiments of the method. In some embodiments, the method 200 can include further operations not depicted in FIG. 11. In some embodiments, the method 200 can include one or more operations depicted in FIG. 11.

Figure 12:
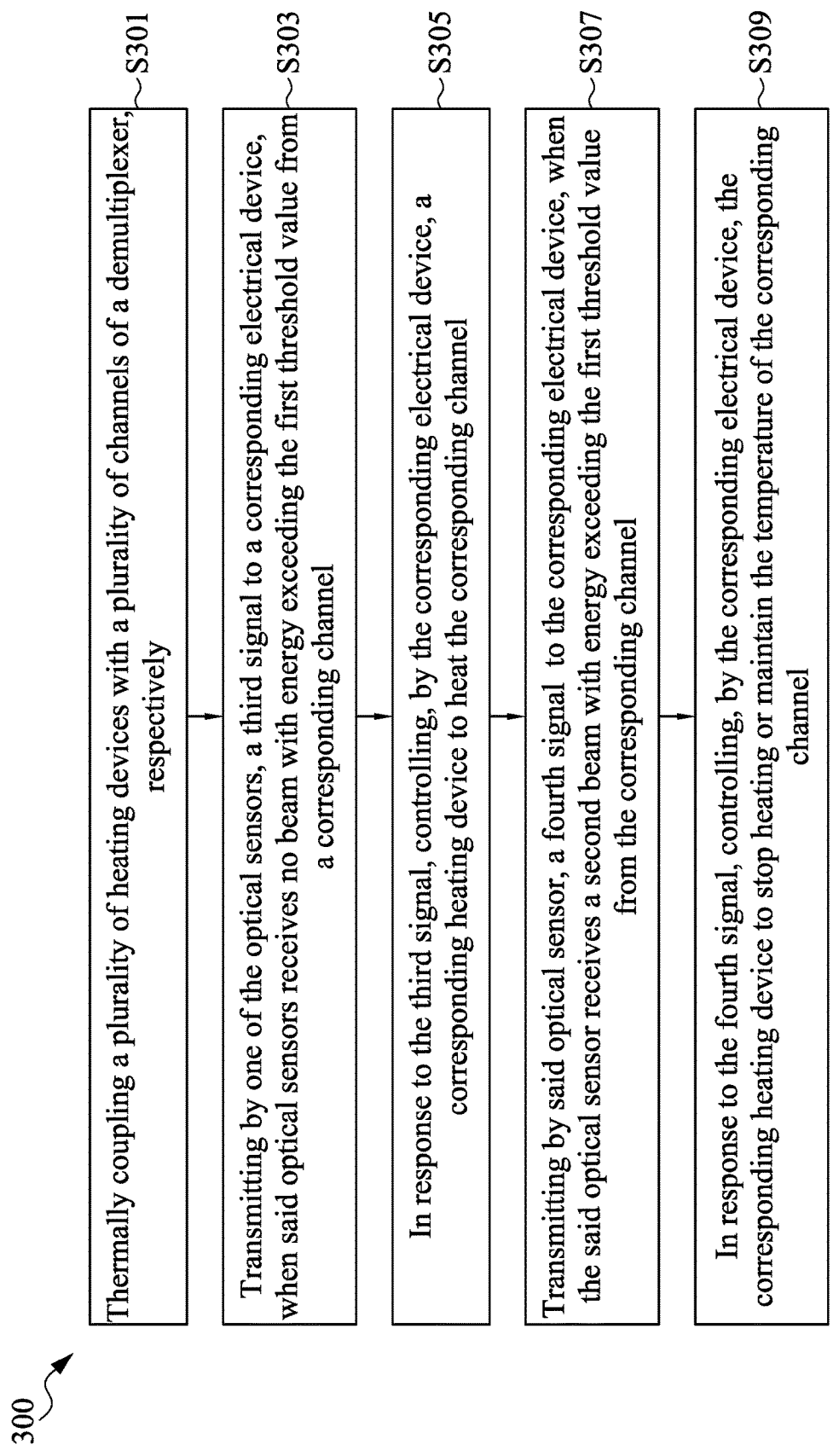
FIG. 12 is a flowchart showing a calibrating method for WDM, in accordance with some embodiments.

FIG. 12 is a flowchart showing a method 300 for a calibrating method for WDM, in accordance with some embodiments of the present disclosure. In some embodiments, this method can be conducted by a calibration system. In some embodiments, the method can be performed by the calibration system illustrated in FIGS. 7 and 10.

In operation S301, the method 300 begins with thermally coupling a plurality of heating devices with a plurality of channels of a demultiplexer.

In operation S303, the method 300 continues with transmitting, by one of the optical sensors (e.g., the optical sensors 31, 32, 33, and 34), a third signal (e.g., the signal S11, S21, S31, or S41) to a corresponding electrical device (e.g., the electrical devices 41, 42, 43, and 44), when said optical sensors receives no beam with energy exceeding the first threshold value from a corresponding channel (e.g., the channels 121, 122, 123, and 124), In some embodiments, the other one of the optical sensors and its corresponding electrical device performs an operation which is the same as operation S303. In some embodiments, each of the optical sensors and their corresponding electrical devices perform an operation which is the same as operation S303.

In operation S305, the method 300 continues with, in response to the third signal, controlling, by the corresponding electrical device, a corresponding heating device (e.g., one of the heating devices 21., 22, 23, and 24) to heat the corresponding channel. In some embodiments, a control signal (e.g., the control signals CS11 CS21, CS31, or CS41) is transmitted, by the corresponding electrical device, to the corresponding heating device. In some embodiments, in response to the control signal, the temperature of the corresponding channels is changed by the corresponding heating device with a delta temperature value (e.g., the delta temperature value $\Delta T11$, $\Delta T12$, $\Delta T13$, or $\Delta T14$). In some embodiments, the other of the optical sensors and its corresponding electrical device perform an operation which is the same as operation S305. In some embodiments, each of the optical sensors and their corresponding electrical devices perform an operation which is the same as operation S305. As such, the temperature of the channel can be independently calibrated, adjusted, or modulated by the corresponding optical sensor, the corresponding electrical device, and the corresponding healing device (e.g., the optical sensor 32, the electrical 42, and the heating device 22). In some embodiments, the wavelengths (wavelengths $\lambda 21$, $\lambda 22$, $\lambda 23$, and $\lambda 24$) of beams transmitted by the one or more of the plurality of channels are shifted based on different delta temperature values.

In operation S307, the method 300 continues with transmitting, by said optical sensor, a fourth signal (e.g., the signal S12, S22, S32, and S42), to the corresponding electrical device, when the said optical sensor receives a second beam (e.g., one of the beams L21, L22, L23, and L24) with energy exceeding the first threshold value from the corresponding channel. In some embodiments, a value of the third signal and a value of the fourth signal are different. In some embodiments, the other of the optical sensors and its corresponding electrical device perform an operation which is the same as operation S307. In some embodiments, each of the optical sensors and their corresponding electrical devices perform an operation which is the same as operation S307.

In operation S309, the method 300 continues with, in response to the fourth signal, controlling, by the corresponding electrical device, the corresponding heating device to stop heating or maintain the temperature of the corresponding channel. In some embodiments, in response to the fourth signal, the corresponding electrical device transmits a control signal (e.g., the control signal CS12, CS22, CS32, or CS42) to one or more of the plurality of heating devices. In some embodiments, in response to the fourth control signal, the corresponding heating device is configured to maintain the temperature of the corresponding channel with a temperature value. In sonic embodiments, the other of the optical sensors and its corresponding electrical device perform an operation which is the same as operation S309. In some embodiments, each of the optical sensors and their corresponding electrical devices perform an operation which is the same as operation S309. In some embodiments, the temperature of each of the channels is maintained with different temperature values. Since the wavelengths of the transmitted beams can be independently calibrated, adjusted, or modulated through independent calibration, adjustment, or modulation of the temperature of channels, the adjustment of the wavelengths of the transmitted beams can be more precise.

The method 300 is merely an example, and is not intended to limit the present disclosure beyond what is explicitly recited in the claims. Additional operations can be provided before, during, or after each operation of the method 300, and some operations described can be replaced, eliminated, or moved around for additional embodiments of the method. In some embodiments, the method 300 can include further operations not depicted in FIG. 12. In some embodiments, the method 300 can include one or more operations depicted in FIG. 12.

Figure 13:
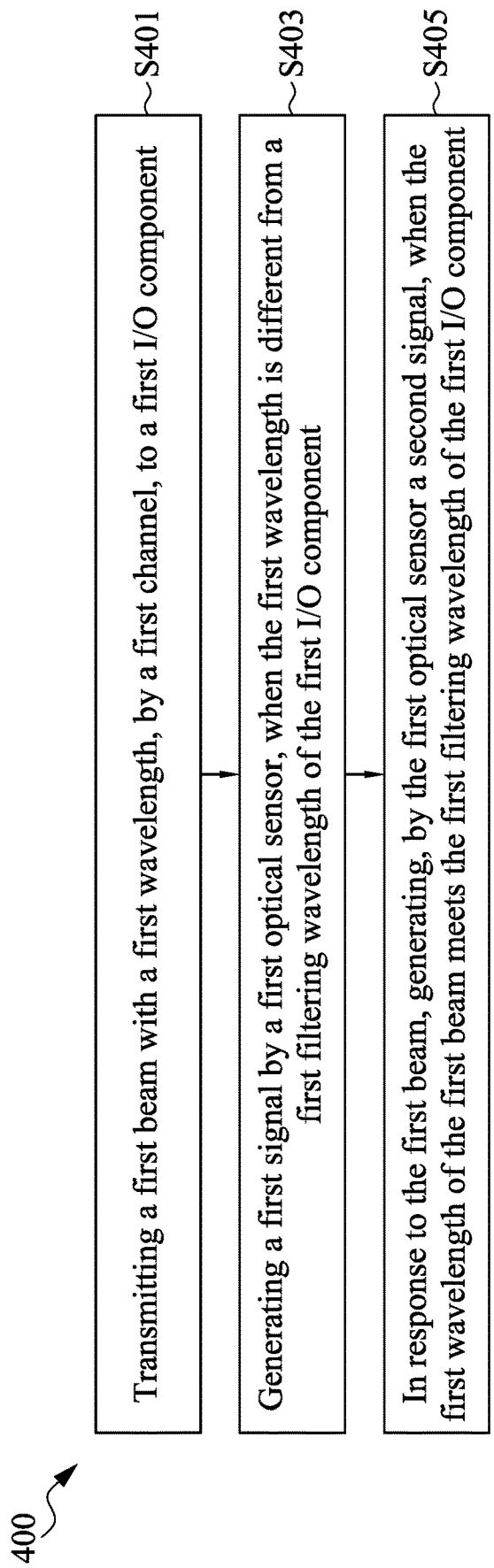
FIG. 13 is a flowchart showing a calibrating method for WDM, in accordance with some embodiments.

FIG. 13 is a flowchart showing a method 400 for a calibrating method for WDM, in accordance with some embodiments of the present disclosure. In some embodiments, this method can be conducted by a calibration system. In some embodiments, the method can be performed by the calibration system illustrated in FIGS. 1, 6, 7 and 10.

In operation S401, the method 400 begins with transmitting a first beam with a first wavelength (e.g. the first beam L21 with the first wavelength $\lambda 21$), by a first channel (e.g., the first channel 121). to a first I/O component (e.g., the first I/O component 131). In some embodiments, the first wavelength may be a central wavelength of the distribution of the first beam. In some embodiments, the first beam may have a bandwidth defined by the first wavelength.

In operation S403, the method 400 continues with generating a first signal (e.g., the first signal S11) by a first optical sensor (e.g., the first optical sensor 3), when the first wavelength is different from a first filtering wavelength of the first I/O component (e.g., the first filtering wavelength $\lambda 31$ of the first I/O component 131). In some embodiments, the frequency response defined by the first filtering wavelength of the first I/O component filters out the first beam when the first wavelength does not meet the first filtering wavelength. In some embodiments, no beam is transmitted from the first I/O component and no beam is received by the first optical sensor. In response to the first signal, a first electrical device of the calibration system is configured to control a first heating device to heat the first channel with a first delta temperature value the first delta temperature $\Delta T1$).

In operation S405, the method 400 continues with, in response to the first beam, generating, by the first optical sensor a second signal (e.g., the second signal S12), when the first wavelength of the first beam meets the first filtering wavelength of the first 110 component. In some embodiments, a value of the first signal is different from a value of the second signal. In some embodiments, in response to the second signal, the first electrical device of the calibration system is configured to control the first heating device to stop heating or maintain the temperature of the first channel. In some embodiments, the electrical device may be configured to control other channels of the demultiplexer through the first signal and the second signal. The temperature of multiple channels of the demultiplexer can be calibrated, adjusted, or modulated by the method 400 simultaneously. The change of the temperature of multiple channels of the demultiplexer may be the same.

The method 400 is merely an example, and is not intended to limit the present disclosure beyond what is explicitly recited in the claims. Additional operations can be provided before, during, or after each operation of the method 400, and some operations described can be replaced, eliminated, or moved around for additional embodiments of the method. In some embodiments, the method 400 can include further operations not depicted in FIG. 13. In some embodiments, the method 400 can include one or more operations depicted in FIG. 13.

Figure 14:
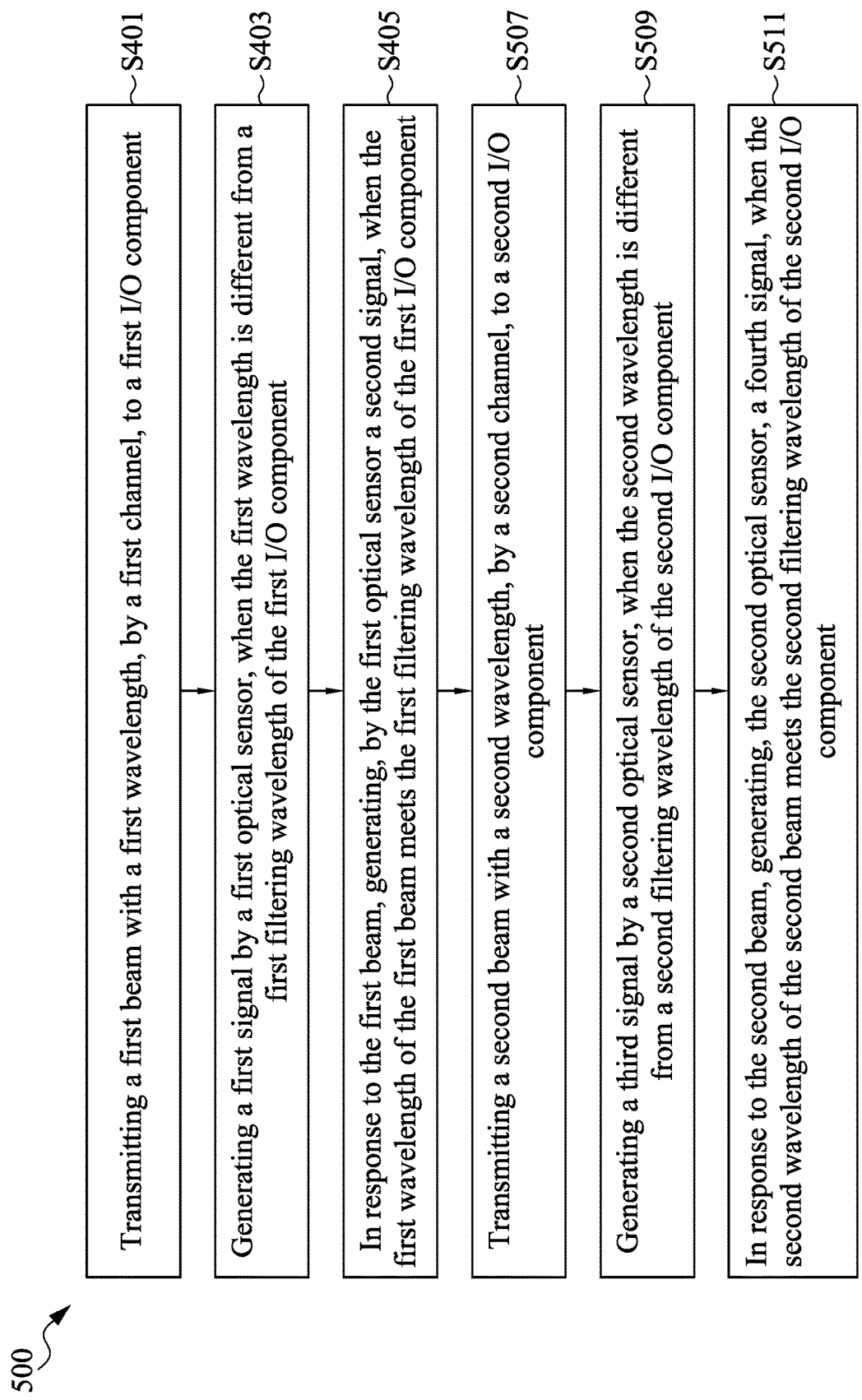
FIG. 14 is a flowchart showing a calibrating method for WDM, in accordance with some embodiments.

FIG. 14 is a flowchart showing a method 500 for a calibrating method for WDM, in accordance with some embodiments of the present disclosure. In some embodiments, this method can be conducted by a calibration system. In some embodiments, the method can be performed by the calibration system illustrated in FIGS. 1, 6, 7 and 10. The method 500 of FIG. 14 is similar to the method 400 of FIG. 13, and the difference therebetween is described below.

The method 500 further includes operation S507 including transmitting a second beam with a second wavelength (e.g. the second beam L22 with the second wavelength λ22), by a second channel (e.g., the second channel 122), to a second I/O component (e.g., the second I/O component 132).

In operation S509, the method 500 continues with generating a third signal (e.g., the signal S21) by a second optical sensor (e.g., the optical sensor 32), when the second wavelength is different from a second filtering wavelength of the second I/O component (e.g., the first filtering wavelength λ32 of the first I/O component 132). In some embodiments, the frequency response defined by the second filtering wavelength of the second I/O component filters out the second beam when the second wavelength does not meet the second filtering wavelength. In some embodiments, no beam is transmitted from the second I/O component and no beam is received by the second optical sensor. In response to the third signal, a second electrical device of the calibration system is configured to control a second heating device to heat the second channel with a second delta temperature value (e.g., the delta temperature value ΔT12). In some embodiments, the first delta temperature value may be different from the second delta temperature value.

In operation S511, the method 500 continues with, in response to the second beam, generating, by the second optical sensor, a fourth signal (e.g., the signal S22), when the second wavelength of the second beam meets the second filtering wavelength of the second I/O component. In some embodiments, a value of the third signal is different from a value of the fourth signal. In some embodiments, in response to the fourth signal, the second electrical device of the calibration system is configured to control the second heating device to stop heating or maintain the temperature of the second channel. In some embodiments, each of the channels is controlled independently by its corresponding optical sensor, electrical device, and heating device. In some embodiments, the temperature of each of the channels is maintained with different temperature values. Since the wavelengths of the transmitted beams can be independently calibrated, adjusted, or modulated through independent calibration, adjustment, or modulation of the temperature of channels, the adjustment of the wavelengths of the transmitted beams can be more precise.

The method 500 is merely an example, and is not intended to limit the present disclosure beyond what is explicitly recited in the claims. Additional operations can he provided before, during, or after each operation of the method 500, and some operations described can be replaced, eliminated, or moved around for additional embodiments of the method. In some embodiments, the method 500 can include further operations not depicted in FIG. 14. In some embodiments, the method 500 can include one or more operations depicted in FIG. 14.

According to some embodiments, a calibration system for wavelength-division multiplexing (WDM) is provided. The calibration system includes a plurality of heating devices, a first optical sensor, and a first electrical device. The plurality of heating devices are thermally coupled with a plurality of channels of a demultiplexer. The first optical sensor is communicated with a first channel of the plurality of the channels. The first electrical device is connected to the first optical sensor and one or more of the plurality of heating devices. When the first optical sensor receives no beam with energy exceeding a first threshold value from the first channel, the first optical sensor transmits a first signal to the first electrical device. In response to the first signal, the first electrical device is configured to control one or more of the plurality of heating devices to heat one or more of the plurality of channels. When the first optical sensor receives a first beam having energy exceeding the first threshold value from the first channel, the first optical sensor transmits a second signal to the first electrical device. In response to the second signal, the first electrical device is configured to control the one or more of the plurality of heating devices to stop heating or maintain the temperature of one or more of the plurality of channels.

According to other embodiments, a wavelength-division multiplexing (WDM) system is provided. The WDM system includes a demultiplexer and a first optical sensor. The demultiplexer includes a first channel and a first I/O component. The first channel is configured to transmit a first beam with a first wavelength to the first I/O component. The first optical sensor is communicated with the first I/O component of the demultiplexer. When the first wavelength is different from a first filtering wavelength of the first I/O component, the first optical sensor generates a first signal. When the first wavelength of the first beam meets the first filtering wavelength of the first I/O component, the first optical sensor is configured to generate a second signal, in response to the first beam.

According to other embodiments, a calibrating method for wavelength-division multiplexing (WDM). The method includes thermally coupling a plurality of heating devices with a plurality of channels of a demultiplexer; transmitting a first signal, by the first optical sensor, to a first electrical device, when no beam with energy exceeding a first threshold value (TE1) is received by a first optical sensor from a first channel of the plurality of channels; in response to the first signal, controlling, by the first electrical device, one or more of the plurality of heating devices to heat one or more of the plurality of channels; transmitting, by the first optical sensor, a second signal to the first electrical device, when a first beam exceeding the first threshold value is received by the first optical sensor from the first channel; and in response to the second signal, controlling, by the first electrical device, the one or more of the plurality of heating devices to stop heating or maintain the temperature of the one or more of the plurality of channels.

The methods and features of the present disclosure have been sufficiently described in the above examples and descriptions. It should be understood that any modifications or changes without departing from the spirit of the present disclosure are intended to be covered in the protection scope of the present disclosure.

Moreover, the scope of the present application in not intended to be limited to the particular embodiments of the process, machine, manufacture, and composition of matter, means, methods and steps described in the specification. As those skilled in the art will readily appreciate from the present disclosure, processes, machines, manufacture, composition of matter, means, methods or steps presently existing or later to be developed, that perform substantially the same function or achieve substantially the same result as the corresponding-embodiments described herein, may be utilized according to the present disclosure.

Accordingly, the appended claims are intended to include within their scope: processes, machines, manufacture, compositions of matter, means, methods or steps. In addition, each claim constitutes a separate embodiment, and the combination of various claims and embodiments are within the scope of the present disclosure.

What is claimed is:

1. A calibration system for wavelength-division multiplexing (WDM), comprising:
   a plurality of heating devices thermally coupled with a plurality of channels of a demultiplexer;
   a first optical sensor communicated with a first channel of the plurality of the channels;
   a first electrical device connected to the first optical sensor and one or more of the plurality of heating devices, wherein:
   (i) when the first optical sensor receives no beam with energy exceeding a first threshold value from the first channel, the first optical sensor transmits a first signal to the first electrical device;
   in response to the first signal, the first electrical device is configured to control the one or more of the plurality of heating devices to heat one or more of the plurality of channels,
   (ii) when the first optical sensor receives a first beam having energy exceeding the first threshold value from the first channel, the first optical sensor transmits a second signal to the first electrical device; and
   in response to the second signal, the first electrical device is configured to control the one or more of the plurality of heating devices to stop heating or maintain the temperature of the one or more of the plurality of channels; and
   a first thermal sensor connected to the first electrical device, wherein the first electrical device is configured to transmit a first electrical signal to the first thermal sensor, and
   wherein, in response to the first electrical signal, the first thermal sensor is configured to measure the temperature of the first channel.

2. The calibration system of claim 1, wherein the first signal has a first value and the second signal has a second value different from the first value.

3. The calibration system of claim 2, wherein the first electrical device is configured to determine whether the first value is lower than a second threshold value,
   wherein when the first value is lower than the second threshold value, the first electrical device transmits a first control signal to the one or more of the plurality of heating devices,
   wherein, in response to the first control signal, the plurality of heating devices is configured to change the temperature of the one or more of the plurality of channels with a first delta temperature value.

4. The calibration system of claim 3, wherein the second value is the same as the second threshold value, and, in response to the second signal, the first electrical device transmits a second control signal to the one or more of the plurality of heating devices, wherein, in response to the second control signal, the one or more of the plurality of heating devices is configured to maintain the temperature of the one or more of the plurality of channels with a first temperature value.

5. The calibration system of claim 3, wherein the one or more of the plurality of channels of the demultiplexer is configured to transmit beams with different wavelengths, and wherein the refractive indexes of the one or more of the plurality of channels change in response to the first delta temperature value.

6. The calibration system of claim 5, wherein the wavelengths of beams transmitted by the one or more of the plurality of channels are shifted with a same value based on the first delta temperature value.

7. The calibration system of claim 1, further comprising:
   a first amplifier connected between the first optical sensor and the first electrical device, wherein the first amplifier is configured to amplify the first signal and/or the second signal.

8. The calibration system of claim 5, further comprising:
   a plurality of optical sensors each communicated with one of the plurality of channels;
   a plurality of electrical devices each connected to one of the plurality of optical sensors and one of the plurality of heating devices,
   wherein:
   (i) when one of the optical sensors receives no beam with an energy exceeding the first threshold value from a corresponding channel, said optical sensor transmits a third signal to a corresponding electrical device;
   in response to the third signal, the corresponding electrical device is configured to control a corresponding heating device to heat the corresponding channel;
   (ii) when the one of the optical sensors receives a second beam with energy exceeding the first threshold value from the corresponding channel, said optical sensor transmits a fourth signal to the corresponding electrical device;
   in response to the fourth signal, the corresponding electrical device is configured to control the corresponding heating device to stop heating or maintain the temperature of the corresponding channel.

9. The calibration system of claim 8, wherein a refractive index of the corresponding channel is shifted based on a second delta temperature value of the corresponding heating device.

10. The calibration system of claim 8, wherein the wavelengths of the beams transmitted by the plurality of channels are shifted based on different delta temperature values.

11. The calibration system of claim 1, wherein the first optical sensor comprises a PIN photodiode.

12. A wavelength-division multiplexing (WDM) system, comprising:
    a demultiplexer comprising a first channel and a first I/O component, wherein the first channel is configured to transmit a first beam with a first wavelength to the first I/O component;
    a first optical sensor communicated with the first I/O component of the demultiplexer,
    wherein
    (i) when the first wavelength is different from a first filtering wavelength of the first I/O component, the first optical sensor generates a first signal;
    (ii) when the first wavelength of the first beam meets the first filtering wavelength of the first I/O component, the first optical sensor is configured to generate a second signal, in response to the first beam;

a first heating device thermally coupled with the first channel of the demultiplexer; and a first electrical device connected to the first optical sensor, wherein, when the first electrical device receives the first signal, the first electrical device is configured to control the first heating device to heat the first channel of the demultiplexer.

13. The WDM system of claim 12, wherein, when the first electrical device receives the second signal, the first electrical device is configured to control the first heating device to stop heating or maintain the temperature of the first channel of the demultiplexer.

14. The WDM system of claim 12, wherein the first signal has a first value and the second signal has a second value, wherein the first value and the second value are different.

15. The WDM system of claim 12, wherein the first I/O component is configured to transmit the first beam when the first wavelength meets the first filtering wavelength.

16. The WDM system of claim 12, wherein:

the demultiplexer comprises a second channel and a second I/O component, wherein the second channel is configured to transmit a second beam with a second wavelength to the second I/O component;

wherein the WDM system further comprises:

a second optical sensor communicated with the second I/O component of the demultiplexer;

wherein (i) when the second wavelength is different from a second filtering wavelength of the second I/O component, the second optical sensor generates a third signal;

(ii) when the second wavelength of the second beam meets the second filtering wavelength of the second I/O component, the second optical sensor is configured to generate a fourth signal, in response to the second beam.

17. The WDM system of claim 16, further comprising:

a second heating device thermally coupled with the second channel of the demultiplexer; and a second electrical device connected to the second optical sensor, wherein, when the second electrical device receives the third signal, the second electrical device is configured to control the second heating device to heat the second channel of the demultiplexer.

18. A calibrating method for wavelength-division multiplexing (WDM), comprising:

thermally coupling a plurality of heating devices with a plurality of channels of a demultiplexer;

transmitting a first signal, by a first optical sensor, to a first electrical device, when no beam with energy exceeding a first threshold value is received by the first optical sensor from a first channel of the plurality of channels;

in response to the first signal, controlling, by the first electrical device, one or more of the plurality of heating devices to heat one or more of the plurality of channels;

transmitting, by the first optical sensor, a second signal to the first electrical device, when a first beam exceeding the first threshold value is received by the first optical sensor from the first channel;

in response to the second signal, controlling, by the first electrical device, the one or more of the plurality of heating devices to stop heating or maintain the temperature of the one or more of the plurality of channels.

transmitting a first electrical signal, by the first electrical device, to a first thermal sensor; and in response to the first electrical signal, measuring, by the first thermal sensor, the temperature of the first channel.

19. The calibrating method of claim 18, further comprising:

transmitting, by one of a plurality of optical sensors, a third signal to a corresponding electrical device, when said optical sensor receives no beam with energy exceeding the first threshold value from a corresponding channel;

in response to the third signal, controlling, by the corresponding electrical device, a corresponding heating device to heat the corresponding channel;

transmitting, by one of the optical sensors, a fourth signal, to the corresponding electrical device, when said optical sensor receives a second beam with energy exceeding the first threshold value from the corresponding channel; and in response to the fourth signal, controlling, by the corresponding electrical device, the corresponding heating device to stop heating or maintain the temperature of the corresponding channel.

20. The calibration method of claim 19, wherein the wavelengths of the beams transmitted by the plurality of channels are shifted based on different delta temperature values.

* * * * *